United States Patent
Ballaguet et al.

(10) Patent No.: US 10,479,684 B2
(45) Date of Patent: Nov. 19, 2019

(54) ENHANCEMENT OF CLAUS TAIL GAS TREATMENT BY SULFUR DIOXIDE-SELECTIVE MEMBRANE TECHNOLOGY AND SULFUR DIOXIDE-SELECTIVE ABSORPTION TECHNOLOGY

(71) Applicant: Saudi Arabian Oil Company, Dhahran (SA)

(72) Inventors: Jean-Pierre R. Ballaguet, Dhahran (SA); Milind M. Vaidya, Dhahran (SA); Iran D. Charry-Prada, Dhahran (SA); Sebastien A. Duval, Dhahran (SA); Feras Hamad, Dhahran (SA); John P. O'Connell, Dhahran (SA); Rashid M. Othman, Khobar (SA)

(73) Assignee: Saudi Arabian Oil Compnay (SA)

( * ) Notice: Subject to any disclaimer, the term of this patent is extended or adjusted under 35 U.S.C. 154(b) by 0 days.

(21) Appl. No.: 16/127,971

(22) Filed: Sep. 11, 2018

(65) Prior Publication Data

US 2019/0016598 A1 Jan. 17, 2019

Related U.S. Application Data

(63) Continuation of application No. 15/457,308, filed on Mar. 13, 2017, now Pat. No. 10,106,411.

(51) Int. Cl.
    *C01B 17/04* (2006.01)
    *C01B 32/50* (2017.01)
    (Continued)

(52) U.S. Cl.
    CPC ........ *C01B 17/0413* (2013.01); *B01D 53/229* (2013.01); *B01D 53/50* (2013.01);
    (Continued)

(58) Field of Classification Search
    CPC ...... B01D 53/48; B01D 53/50; B01D 53/504; B01D 53/74; B01D 61/38; B01D 63/00;
    (Continued)

(56) References Cited

U.S. PATENT DOCUMENTS 3,199,955 A    8/1965   Conroy et al.
3,503,186 A    3/1970   Ward
(Continued)

FOREIGN PATENT DOCUMENTS

CN    102942162 A    2/2013
CN    102989268 A    3/2013
(Continued)

OTHER PUBLICATIONS

Amo et al. "Low-Quality Natural Gas Sulfur Removal/Recovery" by MTR Membrane Technology and Research, Inc.; DOE Report Contract No. DE-AC21-92MC28133-01 Jan. 29, 1998; (pp. 1-107).
(Continued)

*Primary Examiner* — Timothy C Vanoy
(74) *Attorney, Agent, or Firm* — Bracewell LLP; Constance G. Rhebergen

(57) ABSTRACT

A method for recovering sulfur from an acid gas feed is provided. The method comprising the steps of mixing the acid gas feed and an absorption process outlet stream to form a combined Claus feed, introducing the combined Claus feed and a sulfur dioxide enriched air feed to a Claus process to produce a Claus outlet gas stream, introducing the Claus outlet gas stream to a thermal oxidizer, treating the thermal oxidizer outlet stream in a gas treatment unit to produce a dehydrated stream, introducing the dehydrated stream to a membrane sweeping unit to produce a sweep membrane residue stream and a sulfur dioxide enriched air feed, introducing a sweep air stream to a permeate side of the membrane sweeping unit, and introducing the sweep mem-
(Continued)

brane residue stream to a sulfur dioxide absorption process to produce the absorption process outlet stream and a stack feed.

20 Claims, 5 Drawing Sheets

(51) Int. Cl.
| | |
|---|---|
| B01D 53/22 | (2006.01) |
| B01D 53/50 | (2006.01) |
| B01D 53/52 | (2006.01) |
| B01D 53/62 | (2006.01) |
| B01D 53/73 | (2006.01) |
| B01D 53/75 | (2006.01) |
| B01D 53/86 | (2006.01) |

(52) U.S. Cl.
CPC .......... *B01D 53/523* (2013.01); *B01D 53/62* (2013.01); *B01D 53/73* (2013.01); *B01D 53/75* (2013.01); *B01D 53/8615* (2013.01); *C01B 17/0404* (2013.01); *C01B 17/0408* (2013.01); *C01B 17/0447* (2013.01); *C01B 32/50* (2017.08); *B01D 2251/508* (2013.01); *B01D 2251/51* (2013.01); *B01D 2257/302* (2013.01); *B01D 2257/304* (2013.01); *B01D 2257/504* (2013.01); *B01D 2258/0283* (2013.01); *Y02C 10/04* (2013.01); *Y02C 10/10* (2013.01); *Y02P 20/152* (2015.11)

(58) Field of Classification Search
CPC .......................... B01D 65/00; B01D 2252/30; B01D 2257/30; B01D 2257/302; B01D 2257/304; B01D 2311/00; B01D 53/1481; B01D 53/22; B01D 53/62; B01D 2257/504; B01D 53/75; B01D 53/76; B01D 53/8609; B01D 53/8615; C01B 17/0404; C01B 17/60; C10L 3/101; C10L 3/103; C10G 70/045; B01J 19/00; B01J 2219/00; B01J 2219/00002
See application file for complete search history.

(56) References Cited

U.S. PATENT DOCUMENTS

| | | | |
|---|---|---|---|
| 3,819,806 A | 6/1974 | Mayer et al. | |
| 3,928,547 A | 12/1975 | Wilkalis et al. | |
| 4,039,650 A | 8/1977 | Daley | |
| 4,089,653 A | 5/1978 | Ward, III | |
| 4,117,100 A | 9/1978 | Hellmer et al. | |
| 5,002,743 A | 3/1991 | Kokkonen et al. | |
| 5,071,451 A | 12/1991 | Wijmans | |
| 5,089,033 A | 2/1992 | Wijmans | |
| 5,129,921 A | 7/1992 | Baker et al. | |
| 5,147,550 A | 9/1992 | Wijmans et al. | |
| 5,199,962 A | 4/1993 | Wijmans | |
| 5,205,843 A * | 4/1993 | Kaschemekat | B01D 53/22 95/39 |
| 5,256,295 A | 10/1993 | Baker et al. | |
| 5,256,296 A | 10/1993 | Baker et al. | |
| 5,306,476 A | 4/1994 | Jalan et al. | |
| 5,374,300 A | 12/1994 | Kaschemekat et al. | |
| 5,445,669 A | 8/1995 | Nakabayashi et al. | |
| 5,558,698 A | 9/1996 | Baker et al. | |
| 5,755,855 A | 5/1998 | Baker et al. | |
| 5,851,265 A | 12/1998 | Burmaster et al. | |
| 8,524,189 B2 | 9/2013 | Chatterjee et al. | |
| 8,574,539 B2 | 11/2013 | Schoonebeek et al. | |
| 8,658,116 B2 | 2/2014 | Milam et al. | |
| 9,593,015 B2 | 3/2017 | Ballaguet et al. | |
| 2004/0120874 A1 | 6/2004 | Zauderer | |
| 2010/0264065 A1 | 10/2010 | Hamad et al. | |
| 2012/0027656 A1 | 2/2012 | Schaffer et al. | |
| 2012/0042778 A1 | 2/2012 | Jung et al. | |
| 2013/0123556 A1 | 5/2013 | Milani et al. | |
| 2015/0328583 A1 | 11/2015 | Zhou et al. | |
| 2016/0131423 A1 | 5/2016 | Chambron et al. | |

FOREIGN PATENT DOCUMENTS

| | | |
|---|---|---|
| DE | 102007002511 A1 | 7/2008 |
| WO | 9809713 A1 | 3/1998 |

OTHER PUBLICATIONS

Dytnerskii, et al., "SO2 Separation from Gaseous Mixtures by membranes" Journal of Membrane Science, 41 (1989) 49-54.

Froschauer, C., et al. "No matter of course: Ionic liquids as SO2-selective gas absorbers." (2013). pp. 30-43.

Hu, Xing-Bang, et al. "Impact of a-d-glucose pentaacetate on the selective separation of CO 2 and SO 2 in supported ionic liquid membranes." Green Chemistry 14.5 (2012): 1440-1446.

Huang, Kuan, et al. "Facilitated separation of CO 2 and SO 2 through supported liquid membranes using carboxylate-based ionic liquids." Journal of Membrane Science 471 (2014): 227-236.

Jiang, et al., "SO2 Gas Separation Using Supported Ionic Liquid Membrane", J. Phys. Chem. B, 2007, 111 (19), pp. 5058-5061.

Jiang, Yingying, et al. "Permeability and selectivity of sulfur dioxide and carbon dioxide in supported ionic liquid membranes." Chinese Journal of Chemical Engineering 17.4 (2009): 594-601.

Kim et al. "Separation performance of PEBAX/PEI hollow fiber composite membrane for SO 2/CO 2/N 2 mixed gas." Chemical Engineering Journal 233 (2013): 242-250.

Kim, et al., "Hollow fiber membrane process for SO2 removal from flue gas", J Chem Technol Biotechnol (2014), doi: 10.1002/jctb. 4310.

Kuehne, et al., "Selective Transport of Sulfur Dioxide through Polymer Membranes. 1. Polyacrylate and Cellulose Triacetate Single-Layer Membranes", Ind. Eng. Chem. Process Des. Dev., 1980, 19 (4), pp. 609-616.

Luis, et al. "Zero solvent emission process for sulfur dioxide recovery using a membrane contactor and ionic liquids." Journal of Membrane Science 330.1 (2009): 80-89.

Luis, et al. "Sulfur dioxide non-dispersive absorption in N, N-dimethylaniline using a ceramic membrane contactor." Journal of chemical technology and biotechnology 83.11 (2008): 1570-1577.

Orme, et al., "Mixed gas hydrogen sulfide permeability and separation using supported polyphosphazene membranes", Journal of Membrane Science 253 (2005) 243-249.

Ren, et al., "Poly (amide-6-b-ethylene oxide) multilayer composite membrane for carbon dioxide separation", International Journal of Greenhouse Gas Control 8 (2012) 111-120.

Ren, et al., "Poly(amide-6-b-ethylene oxide) membranes for sour gas separation", Separation and Purification Technology 89 (2012) 1-8.

Scholes, et al., "Effects of Minor Components in Carbon Dioxide Capture Using Polymeric Gas Separation Membranes", Separation & Purification Reviews, 38:1, 1-44, (2009).

Shen, J-N et al. "Preparation of a facilitated transport membrane composed of carboxymethyl chitosan and polyethylenimine for CO2/N2 separation." International journal of molecular sciences 14.2 (2013): 3621-3638.

Toy et al. "CO2 Capture Membrane Process for Power Plant Flue Gas." DOE Cooperative Agreement No. DE-NT0005313, and R. T. I. International. (2012). pp. 1-76.

Turk, B. S., et al. "Novel technologies for gaseous contaminants control." Contract DE-AC26-99FT40675 for US DOE by Research Triangle Institute, Research Triangle Park, North Carolina, Sep. 2001. (pp. 1-122).

(56) References Cited

OTHER PUBLICATIONS

Turk, et al., High-Temperature/High-Pressure (HTHP) Membrane Testing, Characterization of NCSU Polymer Samples, Novel Technologies for Gaseous Contaminants Control, Final Report for the Base Program, Control-Doe-for-US-Dept-of-Energy,Chapter 2.5.4 (2-27).

* cited by examiner

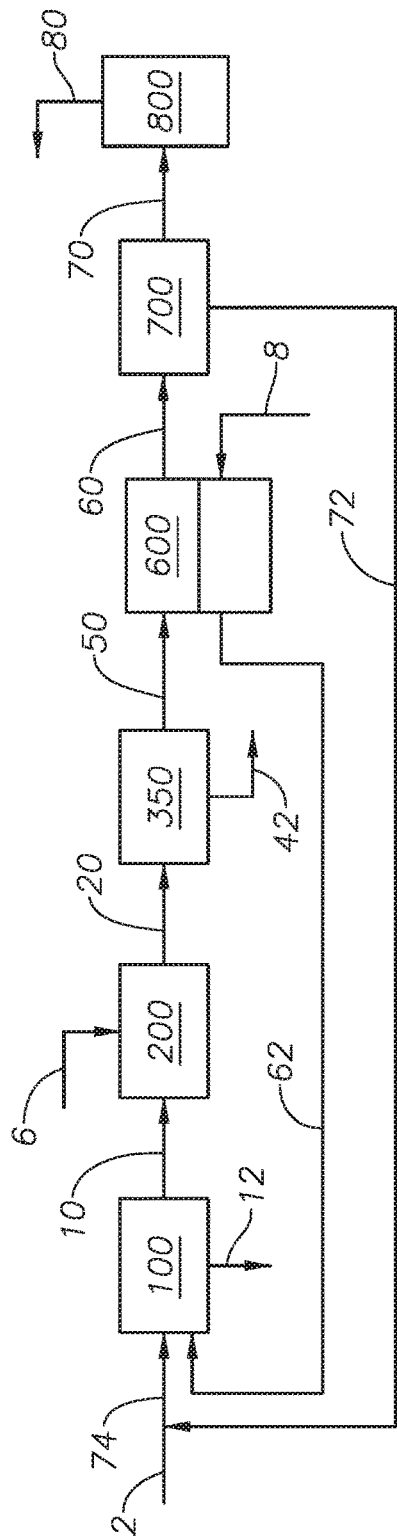
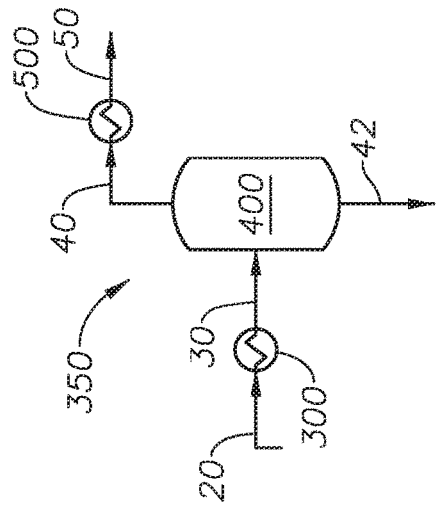
FIG. 1
FIG. 1a

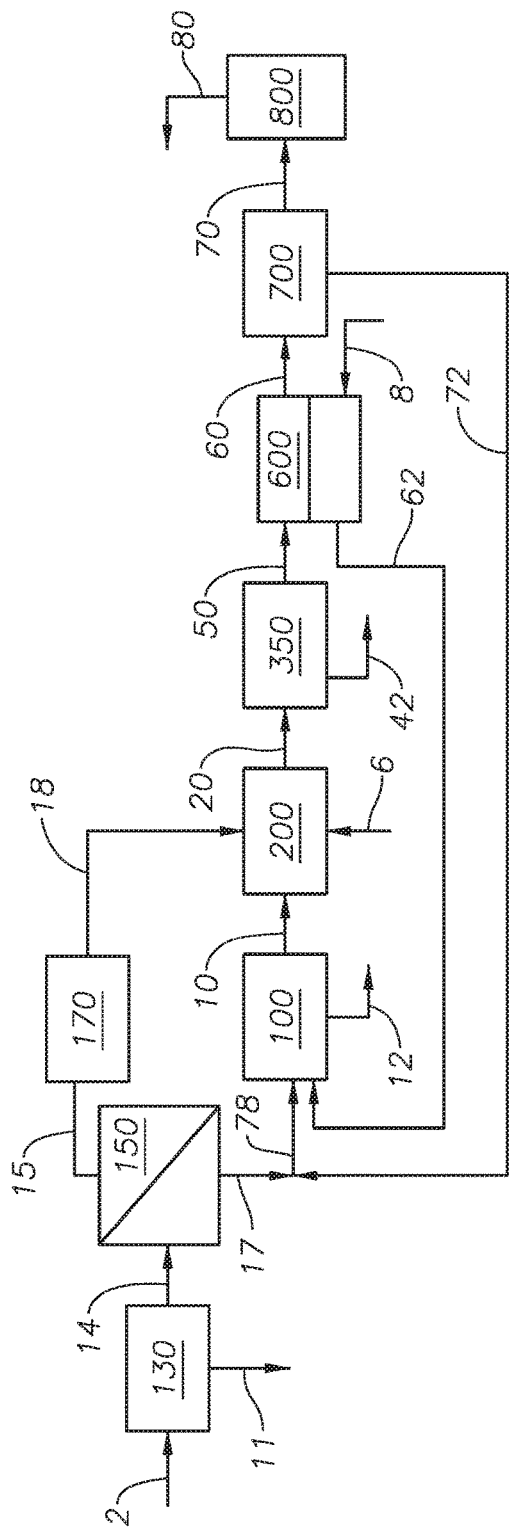
FIG. 4
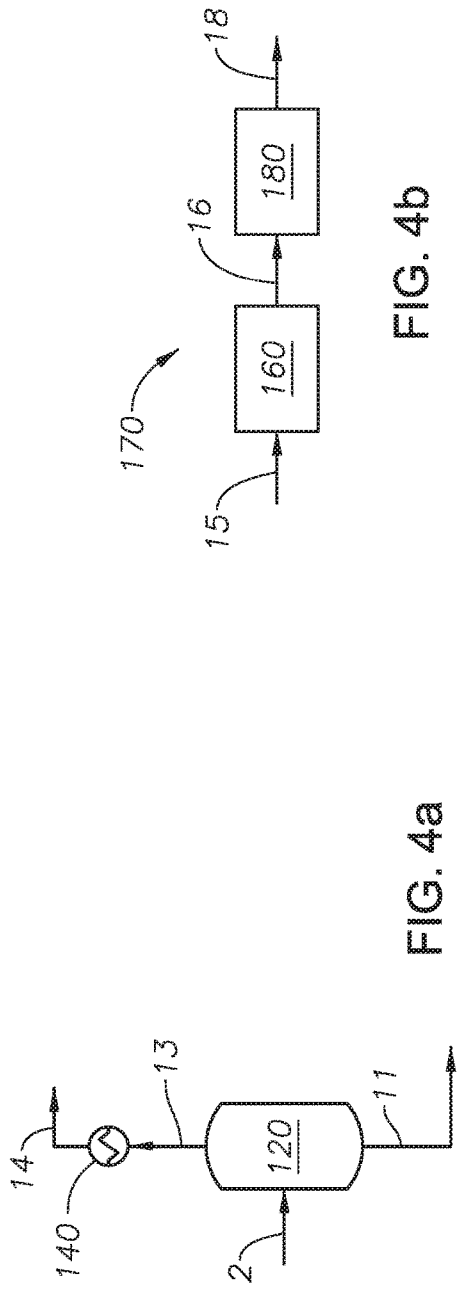
FIG. 4a
FIG. 4b

ENHANCEMENT OF CLAUS TAIL GAS TREATMENT BY SULFUR DIOXIDE-SELECTIVE MEMBRANE TECHNOLOGY AND SULFUR DIOXIDE-SELECTIVE ABSORPTION TECHNOLOGY

CROSS REFERENCE TO RELATED APPLICATIONS

This application is a divisional of and claims priority from U.S. Non-Provisional application Ser. No. 15/457,308 filed on Mar. 13, 2017. For purposes of United States patent practice, this application incorporates the contents of the Non-Provisional application by reference in its entirety.

FIELD OF THE INVENTION

This invention relates to a system and method for improving sulfur recovery from a Claus unit. More specifically, this invention provides a system and method for treating acid gas streams and minimizing sulfur dioxide emissions therefrom.

BACKGROUND OF THE INVENTION

As part of natural gas processing and hydro-treatment of oil fractions, a large amount of hydrogen sulfide ($H_2S$) is produced. The $H_2S$ is toxic and therefore is converted to elemental sulfur (S), which is a more practical and safer state for handling and transportation. With more stringent fuel regulations and increasing environmental concerns, together with the need to process sourer crude oils and natural gases, sulfur recovery has become one of the leading issues in emission reduction. Elemental sulfur is the ultimate state of recovery of the sulfur species.

The conversion of $H_2S$ into elemental sulfur is performed in a sulfur recovery unit (SRU). The level of sulfur recovery is increasingly important as the need to minimize the amount of sulfur compounds released to atmosphere from the recovery unit needs to be reduced in order to meet the mandated legal limits. The most common process used in the world, for this conversion, is known as the modified Claus treatment process or alternately the Claus unit or modified Claus unit.

The modified Claus treatment process is a combination of thermal and catalytic processes that are used for converting gaseous $H_2S$ into elemental sulfur.

Claus unit feed gases have a wide range of compositions. Most of the feed gases originate from absorption processes using various solvents (amine, physical or hybrid solvents) to extract hydrogen sulfide from the by-product gases of petroleum refining, natural gas processing, and also tar sands, coal gasification and other industries. The other gas plants or refinery source of $H_2S$ is the sour water stripper unit.

The first process is a thermal process (i.e., in the absence of catalyst) in a reaction furnace. The feed gas to the Claus unit is burned in the reaction furnace using sufficient combustion air, or oxygen enriched air to burn a stoichiometric one-third of the contained $H_2S$. The reaction furnace pressure is maintained at about 1.5 bars (35-70 KPa above atmospheric pressure) and the temperature is maintained at about 900-1,350° C. in a "no-preheat" operation case. The $H_2S$ from the feed gas is thermally converted into elemental sulfur, along with sulfur dioxide ($SO_2$). Sulfur yield is around 65%-72% depending on the operation mode of the SRU. Increasing the elemental sulfur yield in the reaction furnace and subsequently the condenser is advantageous as it reduces the later load on the catalytic reactors. The reaction furnace operation is designed to maximize sulfur recovery in consideration of the feed composition, by adjusting air/oxygen feed, reaction temperature, pressure, and residence time. In addition, the reaction furnace can destroy contaminants, such as hydrocarbons, that are present in the feed gas stream. Such contaminants pose problems for the catalytic reactors through the development of carbon-sulfur compounds that can lead to plugging or deactivation of the catalyst beds.

The hot reaction product gas from the reaction furnace, containing sulfur vapor, is used to produce high pressure steam in a waste heat boiler, which also results in cooling the gas. The product gas is then further cooled and condensed in a heat exchanger, while producing additional low pressure steam. The condensed liquid sulfur is separated from the remaining unreacted gas in the outlet end of the condenser and sent to a sulfur pit or other collection area.

The separated gas then enters the catalytic process of the Claus unit. The catalytic process contains between two and three catalytic reactors. Following the sulfur condenser, the separated gas is reheated and enters the first catalytic reactor, which is maintained at an average temperature of about 305° C. In the first catalytic reaction about 20% of the $H_2S$ in the feed gas is converted into elemental sulfur through a reaction with the $SO_2$. The temperature is limited by the exit temperature to avoid catalytic bed damages and thermodynamic considerations. The outlet product gas from the first catalytic reactor is cooled, in a second condenser, which can also produce steam. Again, the condensed liquid sulfur is separated from the remaining unreacted gas in the outlet end of the second condenser and sent to sulfur storage. The separated gas from the second condenser is sent to another re-heater and the sequence of gas reheat, catalytic reaction, condensation and separation of liquid sulfur from unreacted gas is repeated for the second and third catalytic reactors at successively lower reactor temperatures. About 5% and 3% of the $H_2S$ in the feed gas are converted into elemental sulfur respectively in the second reactor and third reactors.

Finally, the gas stream is released to atmosphere via a stack after passing through an incinerator which oxidizes any remaining sulfur species into $SO_2$. In addition, the flue gas compounds include water, nitrogen, oxygen, sulfide dioxide and eventually carbon dioxide. The eventual presence of carbon dioxide results from the acid gas composition ($CO_2$ and $H_2S$ are recovered from natural gas during a sweetening process, such as an amine process). Incinerator temperature and gas temperature in the refractory lined stack are high enough (far above gas dew point) to avoid corrosion and help with quick $SO_2$ dissemination in the surrounding air. Moreover, the stack is designed to make sure $SO_2$ concentration at ground level is below the local regulatory limit.

For a well-designed and well-operated Claus sulfur recovery plant having three catalytic reactors, an overall sulfur conversion of 96-98% can be achieved depending on the feed gas composition. To achieve higher conversion, a tail gas treatment unit must be added to further process the exhaust gas upstream of or as an alternative to an incinerator. Tail gas treatment units are polishing units. Currently available tail gas treatment units can be effective at achieving up to 99.2% recovery, but can add significant capital cost to the Claus treatment unit, often on the same order of magnitude as the Claus unit itself.

Tail gas treatment technologies that have been developed include, but are not limited to, the Scot® process, Highsulf™, BSR/MDEA™, Sultimate™, Bechtel TGTU, and Technip TGTU. The choice of tail gas treatment unit installed depends on the conversion targeted as cost is directly linked to the required conversion level. While the Scot process can reach 99.9% sulfur recovery, the added cost and unit complexity makes this process unfeasible when the Claus feed is not highly concentrated with hydrogen sulfide, e.g., unless greater than 55%. In addition to increase operating and capital costs, these technologies can require significant physical footprint for the various process vessels, columns, pumps, and storage vessels necessary for operation.

Additionally, processes can be added as an alternative to tail gas treatment units to target $SO_2$ for removal. There are many techniques that have been developed to process exhaust gas in order to reduce sulfur oxide emissions from combusted gas streams. The techniques are generally divided into regenerative processes and non-regenerative processes and can be further divided into wet processes and dry processes.

Non-regenerative processes include a variety of wet-scrubbing processes, such as a limestone-gypsum process and are the leading technologies when high efficiency $SO_2$ removal is targeted at relatively low cost. In a limestone-gypsum process, flue gas enters an absorber tower and bubbles through a spray of limestone and water, where the $SO_2$ reacts with the lime to create calcium sulfite, which reacts with oxygen to produce gypsum, which can then be disposed. The unreacted gases then exit the top of the tower. The spray tower predominates in the wet desulfurization systems and technologies.

For regenerative processes, the sorbent is reused after thermal or chemical treatment to produce concentrated $SO_2$, which is usually converted to elemental sulfur. These are complex processes requiring high capital outlays and include the magnesium oxide process and Wellman-Lord process. On the dry process side, regenerative processes include the use of activated carbon.

More recently, regenerative processes utilize solvent technologies. Examples of such technologies include: LAB-SORB™, CANSOLV®, ClausMaster™, and Clintox®.

In most cases, flue gas is not saturated. However, before acid gases such as $SO_2$ can be removed, the gas stream must be adiabatically saturated or "quenched." Most scrubbers will have a section where liquid (typically water or the scrubbing reagent itself) is contacted with the incoming flue gas to adiabatically saturate, or "quench," the gas stream.

The LAB-SORB™ process utilizes an inorganic regenerable scrubbing reagent to react with $SO_2$. The reagent, rich in $SO_2$ from the scrubber, is processed in a regeneration unit to strip off the captured $SO_2$, producing fresh reagent for scrubbing. The $SO_2$ removed from the reagent is discharged as concentrated/pure $SO_2$ (90+ %) and can be sent to the front end of a Claus plant (or sulfuric acid plant) for recovery. Solids are removed from the flue gas in a pre-scrubbing section and de-watered in a system similar to what is used in the purge treatment unit of caustic soda based FCCU scrubbing system. Caustic soda (NaOH) and phosphoric acid ($H_3PO_4$) are used for the buffer and small additions are required to make up for small buffer loses. Low pressure steam is used for buffer regeneration in single or double effects evaporation loop. The LAB-SORB™ process produces a minimum amount of waste for disposal, while recovered $SO_2$ can be converted to saleable products such as elemental sulfur, sulfuric acid or liquid SO2. The LAB-SORB™ system can be adapted to many processes, including fossil fuel fired boilers, Claus Tail Gas Treatment, FCCU, Non Ferrous Smelters, Sulfuric Acid Plants, and other $SO_2$ emitting facilities.

The CANSOLV® system is similar to the amine treatment process for removal of $H_2S$ and $CO_2$ from refinery streams and natural gas. The gas is contacted counter currently in the absorption tower, where the CANSOLV® solvent absorbs the sulfur dioxide, reducing the effluent gas down to the design $SO_2$ concentration. The rich amine accumulates in the absorption sump. A constant stream of the CANSOLV® solvent (based on a sterically hindered diamine) is withdrawn from the absorption sump to be regenerated in the stripping tower. Once regenerated, the solvent is recirculated to the absorption tower to pick up additional $SO_2$. Emissions as low as 10 ppmV can be achieved. The main part of the CANSOLV® process consists of a structured packing absorption tower and a regeneration tower, also containing structured packing, equipped with a reboiler and an overhead condenser. Associated peripheral equipment consists of process pumps, heat exchangers, and a process particulate filter. The unit also includes an electro dialysis solvent purification unit. Materials of construction are adjusted to handle the lower pH values resulting from the higher acidity of $SO_2$ compared to $H_2S$ and $CO_2$. More specifically, stronger acids such as sulfuric and hydrochloric are not released in the regeneration column, ensuring that the product $SO_2$ is of high purity.

In the CLAUSMASTER® process hot $SO_2$ gas is cooled by a DynaWave® wet scrubber and gas cooling tower. $SO_2$ removal occurs only after the $SO_2$ gas has been quenched. This is accomplished in two steps: The acid gases are absorbed into the scrubbing liquid. Once absorbed, the acid gases react with the reagent, forming reaction by-products, which then must be removed from the clean gas. After passing through the proprietary $SO_2$ physical absorbent, clean gas exits the stack and the $SO_2$ is stripped from the $SO_2$ loaded absorbent in the stripping tower. Concentrated $SO_2$ is recycled back to the Claus sulfur recovery plant. The recycled $SO_2$ reduces the air and fuel requirements for a typical Claus plant and $H_2S$ tail gas system. This process is not very popular in refineries or gas plants as it adds complexity to existing unit. This process is used for smelters where concentrated $SO_2$ is directed to $H_2SO_4$ production as this chemical is being used in the metal manufacturing process.

The CLINTOX® and SOLINOX® process is a physical scrubber process. The completely oxidized tail gas containing only $SO_2$ is fed to a physical scrubbing tower. The concentrated $SO_2$ is stripped from the solvent in a second column and sent back to the Claus inlet. One advantage of CLINTOX® physical scrubbing is that whatever the feed gas $SO_2$ concentration is, the residual $SO_2$ in the flue is always constant because of the higher solubility of $SO_2$ in the scrubbing solution with higher concentrations in the CLINTOX® feed gas. This self-regulation allows the Claus plant to be less sophisticated and therefore, less expensive. With such a tail gas clean-up process, sulfur recovery rates of nearly 100% are attainable with approximately 80 ppmV residual $SO_2$ in the exhaust gas.

The LAB-SORB™, CANSOLV®, CLAUSMASTER®, CLINTOX® and SOLINOX® are all useful systems and processes useful when the target is to produce $H_2SO_4$ from $SO_2$. However, when combined with the conventional Claus process, these processes increase the complexity of the system by requiring additional equipment and materials. In addition, the processes and systems require increases in energy use. Finally, all of these processes produce waste streams that require removal and processing.

Another type of scrubbing system is using caustic/sodium sulfite solution to capture $SO_2$ from catalytically oxidized sulfur species. Such a system processes lean acid gas over a catalyst which oxidizes the $H_2S$ to $SO_2$ at a temperature of about 700° F. This is desirable for low $SO_2$ emissions as produced sodium sulfite has to be disposed in the waste water system.

Regardless of which scrubbing technology is selected, one downside of scrubbers is that they all must have a method for removing the water droplets and reaction by-products from the gas before they exit the scrubber. In addition, the processes need to provide removal of particulates in addition to acid gas removal. Most wet gas scrubbers will remove some particulates. However, another piece of equipment, such as a venturi scrubber, is often required to accomplish significant removal of particulates.

Therefore, a process which minimizes $SO_2$ being released to atmosphere without requiring excessive amounts of energy, equipment and materials, or process shutdown is desired. Preferably, such a process, would maintain the overall sulfur capacity of the Claus unit, while increasing the overall sulfur recovery efficiency.

SUMMARY OF THE INVENTION

This invention relates to a system and method for improving sulfur recovery from a Claus unit. More specifically, this invention provides a system and method for treating acid gas streams and minimizing sulfur dioxide emissions therefrom.

In one aspect of the present invention, a method for recovering sulfur from an acid gas feed is provided. The method includes the steps of mixing the acid gas feed and an absorption process outlet stream to form a combined Claus feed, wherein the acid gas feed includes a hydrogen sulfide concentration, wherein the absorption process outlet stream includes sulfur dioxide. The method further includes the steps of introducing the combined Claus feed and a sulfur dioxide enriched air feed to a Claus process to produce a Claus outlet gas stream and a recovered sulfur stream, the Claus process configured to convert hydrogen sulfide and sulfur dioxide to elemental sulfur, wherein the recovered sulfur stream includes the elemental sulfur, wherein the Claus outlet gas stream includes sulfur-containing compounds, hydrogen sulfide, and sulfur dioxide, introducing the Claus outlet gas stream and a thermal oxidizer air feed to a thermal oxidizer to produce a thermal oxidizer outlet stream, the thermal oxidizer configured to convert the sulfur-containing compounds and the hydrogen sulfide to sulfur dioxide, wherein the thermal oxidizer outlet stream includes sulfur dioxide and water vapor, treating the thermal oxidizer outlet stream in a gas treatment unit to produce a process condensed water stream and a dehydrated stream, the gas treatment unit configured to cool the thermal oxidizer outlet stream to condense the water vapor in the thermal oxidizer outlet stream, the gas treatment unit further configured to separate the condensed water to produce the process condensed water stream, introducing the dehydrated stream to a membrane sweeping unit to produce a sweep membrane residue stream and a sulfur dioxide enriched air feed, wherein the membrane sweeping unit includes a membrane, wherein the membrane sweeping unit is configured to separate sulfur dioxide from the dehydrated stream, wherein the sulfur dioxide permeates through the membrane of the membrane sweeping unit, introducing a sweep air stream to a permeate side of the membrane sweeping unit, wherein the sweep air stream is operable to enhance separation and collection of the sulfur dioxide that permeates through the membrane of the membrane sweeping unit to create the sulfur dioxide enriched air feed, and introducing the sweep membrane residue stream to a sulfur dioxide absorption process to produce the absorption process outlet stream and a stack feed, the sulfur dioxide absorption process configured to separate sulfur dioxide from the sweep membrane residue stream, wherein the stack feed is below an allowable sulfur dioxide emission limit.

In certain aspects of the present invention, the process further includes the step of feeding the stack feed to an incinerator stack. In certain aspects of the present invention, the membrane is an [emim][BF4] ionic liquid supported on a polyethersulfone. In certain aspects of the present invention, the membrane is selected from the group consisting of polydimethylsiloxane (PDMS), polyphosphazenes, PEBAX® (polyether block amide), polyamide-polyether block copolymers, cellulose acetate, cellulose acetate impregnated with TEG-DME, cellulose diacetate, cellulose triacetate, Nafion® 117, rubbery Nafion®, sulfonated polyimides, sulfonated polymers, supported ionic liquid membranes (SILMs), polycarbonate, membrane contactors, polyethylene glycol (PEG), polyacrylate, sulfolane, polytrimethylsilyl methyl methacrylate (PTMSMMA), and 3-methylsulfolane blend membranes. In certain aspects of the present invention, the hydrogen sulfide concentration is greater than 25%. In certain aspects of the present invention, a sulfur recovery is greater than 99.2 wt %.

In a second aspect of the present invention, a method for recovering sulfur from an acid gas feed is provided. The method includes the steps of mixing the acid gas feed, an absorption process outlet stream, and a membrane recycle stream to form a combined sulfur recovery feed, wherein the acid gas feed includes hydrogen sulfide, wherein the absorption process outlet stream includes sulfur dioxide, wherein the membrane recycle stream includes sulfur dioxide, introducing the combined sulfur recovery feed and a sulfur dioxide enriched air feed to a Claus process to produce a Claus outlet gas stream and a recovered sulfur stream, the Claus process configured to convert hydrogen sulfide and sulfur dioxide to elemental sulfur, wherein the recovered sulfur stream includes the elemental sulfur, wherein the Claus outlet gas stream includes sulfur-containing compounds, hydrogen sulfide, and sulfur dioxide, introducing the Claus outlet gas stream and a thermal oxidizer air feed to a thermal oxidizer to produce a thermal oxidizer outlet stream, the thermal oxidizer configured to convert the sulfur-containing compounds and the hydrogen sulfide to sulfur dioxide, wherein the thermal oxidizer outlet stream includes sulfur dioxide and water vapor, treating the thermal oxidizer outlet stream in a gas treatment unit to produce a process condensed water stream and a dehydrated stream, the gas treatment unit configured to cool the thermal oxidizer outlet stream to condense the water vapor in the thermal oxidizer outlet stream, the gas treatment unit further configured to separate the condensed water, dividing the dehydrated stream into a pressure differential driven membrane feed and a sweep membrane feed, introducing the sweep membrane feed to a membrane sweeping unit to produce a sweep membrane residue stream and a sulfur dioxide enriched air feed, wherein the membrane sweeping unit includes a membrane, wherein the membrane sweeping unit is configured to separate sulfur dioxide from the sweep membrane feed, wherein the sulfur dioxide permeates through the membrane of the membrane sweeping unit, introducing a membrane sweep air stream to a permeate side of the membrane sweeping unit, wherein the membrane sweep air stream is operable to enhance separation and collection of the sulfur dioxide that permeates through the membrane of the membrane sweeping unit to create the sulfur dioxide enriched air feed, introducing the pressure differential driven membrane feed to a pressure differential driven membrane unit to produce a pressure driven residue stream and a pressure driven permeate recycle stream, wherein the pressure differential driven membrane unit includes a pressure driven membrane, wherein the pressure driven membrane has a permeate side and a feed side, wherein the pressure differential driven membrane unit is configured to separate sulfur dioxide from the pressure differential driven membrane feed stream, wherein the sulfur dioxide permeates from the feed side of the membrane to the permeate side of the pressure driven membrane, wherein the pressure driven permeate recycle stream has a permeate pressure, wherein the permeate pressure is below atmospheric pressure, introducing the pressure driven permeate recycle stream to a recycle pressure treatment unit to produce the membrane recycle stream, the recycle pressure treatment unit configured to increase the permeate pressure of the pressure driven permeate recycle stream to above atmospheric pressure, combining the sweep membrane residue stream and the pressure driven residue stream to form a residue stream, and introducing the residue stream to a sulfur dioxide absorption process to produce the absorption process outlet stream and a stack feed, the sulfur dioxide absorption process configured to separate sulfur dioxide from the residue stream, wherein the sulfur dioxide concentration in the stack feed is below an allowable sulfur dioxide emission limit.

In a third aspect of the present invention, a method for recovering sulfur from an acid gas feed is provided. The method includes the steps of introducing the acid gas feed to a feed treatment unit to produce a feed recovered water stream and a carbon dioxide membrane feed, the feed treatment unit configured to condense water vapor in the acid gas feed, wherein the carbon dioxide membrane feed includes carbon dioxide and hydrogen sulfide, introducing the carbon dioxide membrane feed to a carbon dioxide membrane unit to produce a carbon dioxide permeate and a hydrogen sulfide retentate, wherein the carbon dioxide membrane unit includes a carbon dioxide-selective membrane, wherein the carbon dioxide-selective membrane has a permeate side and a retentate side, wherein the carbon dioxide membrane unit is configured to separate carbon dioxide from the carbon dioxide membrane feed, wherein the carbon dioxide permeate has a carbon dioxide permeate pressure, wherein the carbon dioxide permeate pressure is below atmospheric pressure, introducing the carbon dioxide permeate to a feed pressure treatment unit to produce a carbon dioxide enriched feed, the feed pressure treatment unit configured to increase the carbon dioxide permeate pressure of the carbon dioxide permeate to above atmospheric pressure, wherein the carbon dioxide enriched feed is above atmospheric pressure, mixing the hydrogen sulfide retentate and an absorption process outlet stream to form an enriched acid gas feed, wherein the enriched acid gas feed includes hydrogen sulfide, wherein the absorption process outlet stream includes sulfur dioxide, introducing the enriched acid gas feed and a sulfur dioxide enriched air feed to a Claus process to produce a Claus outlet gas stream and a recovered sulfur stream, the Claus process configured to convert hydrogen sulfide and sulfur dioxide to elemental sulfur, wherein the recovered sulfur stream includes the elemental sulfur, wherein the Claus outlet gas stream includes sulfur-containing compounds, hydrogen sulfide, and sulfur dioxide, introducing the Claus outlet gas stream, the carbon dioxide enriched feed, and a thermal oxidizer air feed to a thermal oxidizer to produce a thermal oxidizer outlet stream, the thermal oxidizer configured to convert the sulfur-containing compounds and the hydrogen sulfide to sulfur dioxide, wherein the thermal oxidizer outlet stream includes sulfur dioxide and water vapor, treating the thermal oxidizer outlet stream in a gas treatment unit to produce a process condensed water stream and a dehydrated stream, the gas treatment unit configured to cool the thermal oxidizer outlet stream to condense the water vapor in the thermal oxidizer outlet stream, the gas treatment unit further configured to separate the condensed water, introducing the dehydrated stream to a membrane sweeping unit to produce a sweep membrane residue stream and the sulfur dioxide enriched air feed, wherein the membrane sweeping unit includes a membrane, wherein the membrane sweeping unit is configured to separate sulfur dioxide from the dehydrated stream, wherein the sulfur dioxide permeates through the membrane of the membrane sweeping unit, introducing a sweep air stream to a permeate side of the membrane of the membrane sweeping unit, wherein the sweep air stream is operable to enhance separation and collection of the sulfur dioxide that permeates through the membrane of the membrane sweeping unit to create the sulfur dioxide enriched air feed, and introducing the sweep membrane residue stream to a sulfur dioxide absorption process to produce the absorption process outlet stream and a stack feed, the sulfur dioxide absorption process configured to separate sulfur dioxide from the sweep membrane residue stream, wherein the sulfur dioxide concentration in the stack feed is below an allowable sulfur dioxide emission limit.

BRIEF DESCRIPTION OF THE DRAWINGS

These and other features, aspects, and advantages of the present invention will become better understood with regard to the following descriptions, claims, and accompanying drawings. It is to be noted, however, that the drawings illustrate only several embodiments of the invention and are therefore not to be considered limiting of the invention's scope as it can admit to other equally effective embodiments.

FIG. 1 is a process flow diagram of the method to recover sulfur.

FIG. 1a is a detail process flow diagram of an embodiment of gas treatment unit 350.

FIG. 4 is a process flow diagram of the method to recover sulfur.

FIG. 4a is a detail process flow diagram of an embodiment of feed treatment unit 130.

FIG. 4b is a detail process flow diagram of an embodiment of feed pressure treatment unit 170.

DETAILED DESCRIPTION OF THE INVENTION

Figure 2:
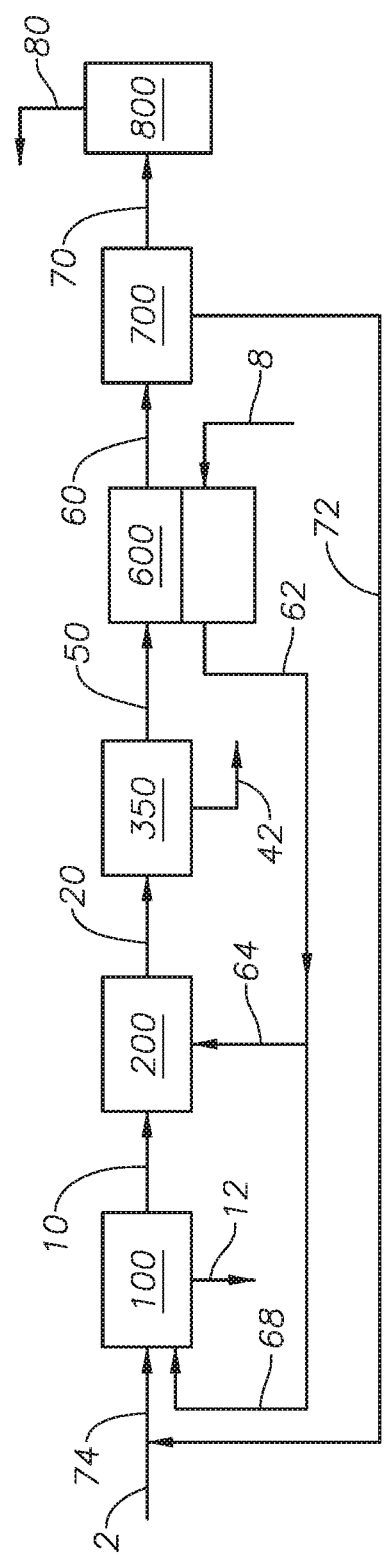
FIG. 2 is a process flow diagram of the method to recover sulfur.

While the invention will be described with several embodiments, it is understood that one of ordinary skill in the relevant art will appreciate that many examples, variations and alterations to the apparatus and methods described herein are within the scope and spirit of the invention. Accordingly, the exemplary embodiments of the invention described herein are set forth without any loss of generality, and without imposing limitations, on the claimed invention.

As used herein, "sulfur-containing compounds" refers to compounds that contain sulfur that can be products or reactants in the Claus process reactions or in the thermal oxidizer reactions. Sulfur-containing compounds does not include sulfur dioxide or hydrogen sulfide as the presence of those compounds can be called out separately. The term sulfur-containing compounds is meant to be a catchall for sulfur containing-compounds, other than sulfur dioxide and hydrogen sulfide. Examples of sulfur-containing compounds include, but are not limited to, carbonyl sulfur and carbon disulfide.

As used herein, "allowable sulfur dioxide emission limit" refers to a rate of release of sulfur dioxide into the atmosphere. The rate of release can be mandated by federal, state, or local agencies.

As used herein, "air" refers to the collective gases that constitute earth's atmosphere. Air contains nitrogen, oxygen, argon, carbon dioxide, and water vapor. Unless otherwise indicated, oxygen-enriched air is considered air with an oxygen content of greater than 21% by volume on a dry basis. Unless otherwise indicated, the use of the term air includes all of the gases listed.

As used herein, "overall sulfur recovery" or "sulfur recovery" refers to the percentage of sulfur removed based on the amount of sulfur present in the acid gas feed stream. A recovery of 99.0% means that 99.0% of the sulfur in the acid gas feed stream is recovered as part of the recovered sulfur stream.

As used herein, "permeate" means to spread through or flow through or pass through a membrane of a membrane unit. Liquids and gases can permeate a membrane.

As used herein, "Claus catalytic stage" refers to the combination of a reheater, catalytic reactor, and condenser. The feed to the Claus catalytic stage is heated in the reheater to ensure the temperature is above the condensation point of sulfur. The heated stream is then fed to the catalytic reactor, where a Claus catalytic reaction to produce elemental sulfur from hydrogen sulfide and sulfur dioxide occurs over a catalyst. The product from the Claus catalytic reaction is introduced to a condenser, where the elemental sulfur is condensed and separated from the stream as liquid sulfur.

According to a method of the invention, $SO_2$ is removed from a Claus process outlet stream containing $SO_2$, $CO_2$, $H_2O$, $N_2$ and $O_2$ using a $SO_2$-selective membrane and a $SO_2$-selective absorption process in series. In at least one instance of the present invention, the air feed supplied to the reaction furnace of the Claus unit sweeps the permeate side of the $SO_2$-selective membrane prior to being supplied to the reaction furnace, and in doing so the air feed becomes a $SO_2$-enriched air feed to the reaction furnace. "Sweep" as used herein means that the air stream passes continuously by the membrane, such that the permeate does not sit statically against the permeate side of the membrane, such that the sweep provides the driving force for the separation. The air sweep lowers the $SO_2$ concentration on the permeate side of the membrane, thereby causing more $SO_2$ to be drawn into the membrane from the dehydrated stream and sent, along with the air sweep, to the Claus unit. With the air sweep, the $SO_2$ concentration on the permeate side is lower than the $SO_2$ on the feed side of the membrane.

The air sweep and the $SO_2$-enriched air feed recovers a fraction of the $SO_2$ that would otherwise have been released to the atmosphere through an incinerator stack, and by recovering the $SO_2$ and directing the $SO_2$-enriched air feed to the Claus furnace, the process provides controlled slippage of $SO_2$ to the atmosphere at the incinerator stack in order to meet environmental regulations or other process targets. In at least one embodiment of the present invention, the use of the $SO_2$-selective membrane minimizes $SO_2$ emissions from an incinerator stack. In one embodiment of the invention, the $SO_2$-selective membrane recovers sulfur dioxide from the exhaust gas of the thermal oxidizer before the exhaust gas is fed to an incinerator stack. The recovered sulfur dioxide is collected by sweeping the permeate side with an air stream, which creates a sulfur dioxide rich air stream. The sulfur dioxide rich air stream can be fed to the reaction furnace of the Claus process, along with a raw air feed, and an acid gas stream. In at least one embodiment of the present invention, the use of the $SO_2$-selective membrane improves the Claus unit operability and efficiency to maximize elemental sulfur recovery and minimizes $SO_2$ emissions from an incinerator stack. In at least one embodiment of the present invention, the $SO_2$-selective membrane can be retrofitted to an existing Claus unit or modified Claus process, regardless of the Claus unit and tail gas treatment unit.

Advantageously, the present invention can improve the capability of a $SO_2$-selective absorption process and can reduce the costs to build and operate, thereby improving the overall economics of a sulfur recovery system.

The remaining gases the include $SO_2$, $CO_2$, $H_2O$, $N_2$ and $O_2$ are fed to the $SO_2$-selective absorption process to further remove $SO_2$.

Advantageously, placing the $SO_2$-selective membrane and $SO_2$-selective absorption process in series maximizes the recovery of $SO_2$. In contrast, a parallel system, where the $SO_2$-selective membrane and $SO_2$-selective absorption process are in parallel, such that equimolar flows are sent to each, would result in a reduced $SO_2$ recovery in the bulk separation process of the $SO_2$-selective membrane. In addition, running the $SO_2$-selective membrane and $SO_2$-selective absorption process in series results in a more effective and efficient control system with respect to controlling the $SO_2$ concentration going to the incinerator stack. In parallel, two control systems must monitor two feeds to the stack to guarantee the $SO_2$ concentrations are within the limits set by regulations. In other words, maintaining the systems in series results in easier and safer operability.

The use of the $SO_2$-selective membrane is based upon gas component separation with membranes that exhibit durable high $SO_2/CO_2$ and $SO_2/N_2$ selectivity. These selective membranes minimize recirculation of inert gases potentially present in the flue gas, such as $CO_2$ and $N_2$. The membrane produces a $SO_2$-concentrated permeate fraction, which is fed to the reaction furnace of the Claus unit along with the air supply. The membrane also produces an $SO_2$-depleted residue (retentate) fraction, which is fed to the $SO_2$-selective absorption process to further remove $SO_2$ before the gases are released to atmosphere.

Referring to FIG. 1 a sulfur recovery system is provided. Acid gas feed 2 is combined with absorption process outlet stream 72 to produce combined Claus feed 74. Any known method of combining or mixing two fluid streams can be used. Acid gas feed 2 can be any source of acid gas or sour gas, containing $H_2S$, $CO_2$, and combinations thereof. In certain embodiments, acid gas feed 2 can include $H_2O$. Acid gas feed 2 contains a $H_2S$ concentration in an amount greater than 25% by weight on a dry basis, alternately greater than 40% by weight on a dry basis, alternately greater than 55% by weight on a dry basis, alternately greater than 70% by weight on a dry basis, greater than 75% by weight on a dry basis, alternately greater than 80% by weight on a dry basis, and alternately greater than 99% by weight on a dry basis. As used herein "on a dry basis" means as calculated without water or water vapor. Combined Claus feed 74 is introduced to Claus process 100 along with sulfur dioxide enriched air feed 62.

Claus process 100 can be a conventional Claus process or modified Claus process, a known process for recovering elemental sulfur from $H_2S$, through combustion and catalytic reactions that includes a thermal stage, such a reaction furnace (not shown), a condenser, and one or more Claus catalytic stages, such as catalytic reactors (not shown). Advantageously and unexpectedly, embodiments of the present invention that include a sweeping membrane unit can improve the process such that only one Claus catalytic stage is needed to achieve the sulfur recovery. As one of skill in the art would understand, conventional or modified Claus units contain two or three catalytic reactors. Advantageously, a Claus unit with only one Claus catalytic stage is an improvement, due to the reduced catalyst load needed and the reduced energy usage in the Claus process. In at least one embodiment of the present invention, the method to recover sulfur allows for the use of a single Claus catalytic stage without the loss of sulfur recovery. Claus process 100 produces recovered sulfur stream 12 and Claus outlet gas stream 10. Recovered sulfur stream 12 is a liquid stream of elemental sulfur sent to storage or a sulfur pit for further use or processing. Without being bound to a particular theory, it is believed that the stable form of sulfur that can be separated as a liquid from the process is $S_8$. Claus outlet gas stream 10 can include unreacted $H_2S$, $SO_2$, sulfur containing compounds, $CO_2$, air, and combinations thereof. Claus outlet gas stream 10 enters thermal oxidizer 200 along with thermal oxidizer air feed 6 to generate thermal oxidizer outlet stream 20.

Thermal oxidizer 200 can be any thermal oxidizer capable of providing a combustion temperature to convert the sulfur containing compounds and $H_2S$ in Claus outlet gas stream 10 into $SO_2$. Thermal oxidizer air feed 6 can be any source of air, oxygen, or oxygen-enriched air. Thermal oxidizer air feed 6 is fed to thermal oxidizer 200 in excess of the volume necessary to combust the remaining $H_2S$ and sulfur containing compounds in Claus outlet gas stream 10, such that thermal oxidizer outlet stream 20 contains $SO_2$, $O_2$, $N_2$, $CO_2$, $H_2O$, and combinations thereof. Thermal oxidizer outlet stream 20 can contain other inert gases present in air. Thermal oxidizer outlet stream 20 is introduced to gas treatment unit 350.

Gas treatment unit 350 can include any process units capable of removing a portion of the $H_2O$ present in thermal oxidizer outlet stream 20 to produce process condensed water stream 42 and dehydrated stream 50. Process condensed water stream 42 contains the water condensed in gas treatment unit 350. Process condensed water stream 42 can be sent to be further processed or collected for storage. Dehydrated stream 50 contains those gases that do not condense in gas treatment unit 350. Dehydrated stream 50 is fed to the feed side of membrane sweeping unit 600.

Referring to FIG. 1a, an embodiment of gas treatment unit 350 is provided. As shown in FIG. 1a, gas treatment unit 350 includes process cooler 300, process flash unit 400, and process heater 500.

Process cooler 300 can lower the temperature of thermal oxidizer outlet stream 20 to a temperature below the dew point of water to produce cooled gas stream 30. Process cooler 300 can be any type of heat exchanger capable of reducing the temperature of a gas stream. In at least one embodiment of the present invention, process cooler 300 is a quench tower. Cooled gas stream 30 is at a temperature at or just below the dew point of water, such that water vapor present in thermal oxidizer outlet stream 20 is condensable. Cooled gas stream 30 is introduced to flash unit 400.

Flash unit 400 is any type of separation unit capable of allowing water vapor present in cooled gas stream 30 to condense as liquid water and separate such that the gas in cooled gas stream 30 is separated from the liquid water to produce process condensed water stream 42 and saturated gas stream 40. Process condensed water stream 42 contains the liquid water condensed from cooled gas stream 30. Saturated gas stream 40 contains those gases from thermal oxidizer outlet stream 20 that were not condensed in flash unit 400. Saturated gas stream 40 can include $SO_2$ and air. Saturated gas stream 40 is introduced to process heater 500 to produce dehydrated stream 50.

Process heater 500 can heat saturated gas stream 40 to a temperature above the dew point of the gases present in saturated gas stream 40 to ensure no liquids are present in dehydrated stream 50. Process heater 500 can be any type of heat exchanger capable of heating up a gas stream.

Referring to FIG. 1, membrane sweeping unit 600 is any membrane unit capable of separating sulfur dioxide from dehydrated stream 50. Membrane sweeping unit 600 includes a membrane. The membrane can be any membrane able to separate one or more gases from a feed mixture generating a permeate containing a specific gas enriched stream. Membrane permeability characterizes performance and is dictated by flux and selectivity for a specific gas molecule. Separation is dependent on the physicochemical interaction of gases with the polymeric membrane. Permeability is expressed in GPU (Gas Permeation Units) or barrier. Exemplary membranes include membranes made from polydimethylsiloxane (PDMS), polyphosphazenes, PEBAX® (polyether block amide), polyamide-polyether block copolymers, cellulose acetate, cellulose acetate impregnated with TEG-DME, cellulose diacetate, cellulose triacetate, Nafion® 117 (perfluorosulfonic acid), rubbery Nafion®, sulfonated polyimides, sulfonated polymers, supported ionic liquid membranes (SILMs), polycarbonate, membrane contactors, polyethylene glycol (PEG), polyacrylate, sulfolane, polytrimethylsilyl methyl methacrylate (PT-MSMMA), and 3-methylsulfolane blend membranes.

Ionic liquid membranes are membranes that are doped with liquid ionic compounds (LICs). Preferably, the liquid ionic compounds have non-nucleophilic anions, such non-nucleophilic anions increase the $SO_2$ content in the permeate by preferential solubility, permeability and selectivity of the components in the LICs. The use of LICs in membrane sweeping unit 600 takes advantage of low vapor pressure avoiding the loss of the liquids due to evaporation from the pores of the membrane and the preferential solubility of $SO_2$ in ionic liquids. Exemplary SILM membranes include membranes impregnated with carboxylate-based ILs (including mono-carboxylates and dicarboxylates), membranes impregnated with 1-butyl-3-methylimidazolium 2-formylbenzenesulfonate (BMIM OFBS), membranes impregnated with 1-allyl-3-methylimidazolium 2-formylbenzenesulfonate (AMIM OFBS), [N222] [dimalonate] IL supported on polyethersulfone (PES), and [emim][BF4] IL supported on polyethersulfone (PES).

In at least one embodiment of the present invention, membrane sweeping unit 600 is a [emim][BF4] ionic liquid supported on a polyethersulfone. An [emim][BF4] ionic liquid supported on a polyethersulfone type membrane has increased SO₂ permeability due to the presence of the active carrier, [emim][BF4] ionic liquid.

One of skill in the art will appreciate that the size, permeability, and selectivity of membrane sweeping unit 600 are design features based on the requirements of the system. While in general the larger the surface area, the greater the recovery, there is a tipping point at which the economics make it unfeasible to increase the surface area of the membrane. The type of membrane selected is in consideration of the desired permeability and selectivity of the membrane, the acid gas feed composition, and the available air for sweeping.

Dehydrated stream 50 contacts the feed side of the membrane of membrane sweeping unit 600. Sulfur dioxide present in dehydrated stream 50 permeates through the membrane of membrane sweeping unit 600 to the permeate side of the membrane. The SO₂ on the permeate side of the membrane is collected in sweep air stream 8 to produce sulfur dioxide enriched air feed 62. Sweep air stream 8 provides a continuous stream of air to sweep the permeate side of membrane sweeping unit 600. Sweep air stream 8 enhances separation in membrane sweeping unit 600. In at least one embodiment, sweep air stream 8 enhances separation and collection of the sulfur dioxide that permeates through the membrane of membrane sweeping unit 600. Sweep air stream 8 drives the sulfur dioxide to permeate from dehydrated stream 50 across the membrane of membrane sweeping unit 600.

Sweep air stream 8 is any source of air, oxygen, or oxygen enriched air. In at least one embodiment of the present invention, an oxygen enrichment membrane system (not show) can be utilized to create oxygen enriched air from a raw air stream, where oxygen enrichment membrane system uses an oxygen selective membrane to separate oxygen from an air stream. The oxygen enrichment membrane system can be any system of membranes capable of extracting oxygen from an air stream to provide enriched air or a pure oxygen stream. The oxygen enrichment membrane system can be those known to one of skill in the art. The oxygen enriched air can be used as sweep air stream 8 to sweep membrane sweeping unit 600. Alternately, the oxygen enriched air can be used as a direct feed to Claus process 100 or thermal oxidizer 200, or both. Oxygen enrichment of the combustion air to the reaction furnace of Claus process 100 improves, for example increases, capacity and improves the ability to handle contaminants. Without being bound to a particular theory, it is believed that the capacity of the reaction furnace is increased with oxygen enrichment due to the need for less gas flow (the more oxygen in the stream, the lower the overall flow needed) into the reaction furnace of Claus process 100. Expanding capacity with oxygen enrichment can be used for handling extra acid gas loading at significantly reduced capital expense. Increased oxygen content in the reaction furnace of Claus process 100 increases flame temperature, which helps destroy contaminants and increase sulfur recovery. An oxygen selective membrane system is advantageous over other types of oxygen recovery units because it does not require significant operating costs due to high energy demands.

The SO₂ that reaches the permeate side of membrane sweeping unit 600 blends with sweep air stream 8 and the combined stream exits membrane sweeping unit 600 as sulfur dioxide enriched air feed 62. Sulfur dioxide enriched air feed 62 is fed to the thermal stage of Claus process 100. Sulfur dioxide enriched air feed 62 can include SO₂ and air. SO₂ and the oxygen present from the air are reactants in the Claus reaction to recover elemental sulfur.

In at least one embodiment according to FIG. 1, sulfur dioxide enriched air feed 62 can increase the flame temperature within the reaction furnace of the thermal stage of Claus process 100. In at least one embodiment according to FIG. 1, sulfur dioxide enriched air feed 62 can increase the flame temperature within the reaction furnace of the thermal stage of Claus process 100 by between about 2 degrees kelvin (K) and 5 K. In at least one embodiment, sulfur dioxide enriched air feed 62 can be preheated in a heating unit (not shown) to maintain or increase the temperature in the reaction furnace. The impact on flame temperature is due to overall mass flow rate, overall composition of the feed to the reaction furnace. The overall composition of the feed is influenced by the amount of sulfur recovered and the amount of sulfur dioxide recycled to the reaction furnace.

In certain embodiments, sulfur dioxide enriched air feed 62 can be split between thermal oxidizer 200 and Claus process 100, as shown in FIG. 2. Thermal oxidizer air 64 is fed to thermal oxidizer 200. Enriched air stream 68 is fed to Claus process 10. The flow rate of sweep air stream 8 can be determined based on the air needs of the overall system or of each unit operation, the composition of acid gas feed 2, the membrane characteristics of membrane sweeping unit 600, the flue gas composition, the target rate for SO₂ in stack outlet stream 80, the allowable sulfur dioxide emission rate of SO₂ in stack outlet stream 80, or combinations of the same. The split between thermal oxidizer air 64 and enriched air stream 68 can be based on the air needs of the overall system or the air needs of each of thermal oxidizer 200 and Claus process 100. In at least one embodiment according to FIG. 2, enriched air stream 68 can decrease the flame temperature within the reaction furnace of the thermal stage of Claus process 100. The decrease in flame temperature can be between about 5 K and 10 K, alternately between less than 10 K.

The remaining gases from dehydrated stream 50 that did not permeate the membrane in membrane sweeping unit 600 form the retentate and exit membrane sweeping unit 600 as sweep membrane residue stream 60. Sweep membrane residue stream 60 is introduced to sulfur dioxide absorption process 700.

Sulfur dioxide absorption process 700 selectively recovers a portion of SO₂ from sweep membrane residue stream 60 to produce absorption process outlet stream 72 and stack feed 70. Sulfur dioxide absorption process 700 can be any SO₂-selective absorption process capable of separating SO₂ from a gas stream. In at least one embodiment, sulfur dioxide absorption process 700 is a reactive absorption process, with minimal absorption of gases other than sulfur dioxide. In at least one embodiment, sulfur dioxide absorption process 700 is a reactive absorption process with up to 99.99% recovery of SO₂. In at least one embodiment, the portion of SO₂ recovered in sulfur dioxide absorption process 700 is 99.99% of the volume entering in sweep membrane residue stream 60.

Absorption process outlet stream 72 can be recycled to the reaction furnace of Claus process 100. Absorption process outlet stream 72 can include sulfur dioxide.

Those gases that are not absorbed by sulfur dioxide absorption process 700 exit as stack feed 70. Stack feed 70 is fed to incinerator stack 800. Incinerator stack 800 can be any type of incinerator stack capable of heating the remaining gases in stack feed 70 for dissemination in the atmosphere as stack outlet stream 80. The species in stack outlet stream 80 are oxidized to their final oxidation state in incinerator stack 800. The concentration of sulfur dioxide in stack feed 70 can be less than an allowable sulfur dioxide emission limit, alternately less than 75 parts-per-billion/hour (ppb/hr), alternately less than 50 ppb/hr, and alternately less than 10 ppb/hr. In at least one embodiment of the present invention, the concentration of sulfur dioxide in stack feed 70 is less than 75 ppb/hr.

The process of the present invention according to FIG. 1 can recycle at least 45% of the sulfur dioxide in dehydrated stream 50 to Claus process 100 in sulfur dioxide enriched air feed 62. The amount of sulfur dioxide recycled in sulfur dioxide enriched air feed 62 reduces the amount of sulfur dioxide in sweep membrane residue stream 60, which in turn reduces the size of sulfur dioxide absorption process 700.

The overall sulfur recovery can be greater than 99.0%, alternately greater than 99.2%, alternately greater than 99.4%, alternately greater than 99.6%, alternately greater than 99.8%, alternately greater than 99.9%. In at least one embodiment, $SO_2$ is not physically removed from the system, although $SO_2$ can be removed from certain streams and recovered in other streams.

In at least one embodiment as shown according to FIG. 1, the use of membrane sweeping unit 600 can reduce the number of catalyst beds in Claus process 100 from three catalyst beds to one catalyst bed.

Figure 3:
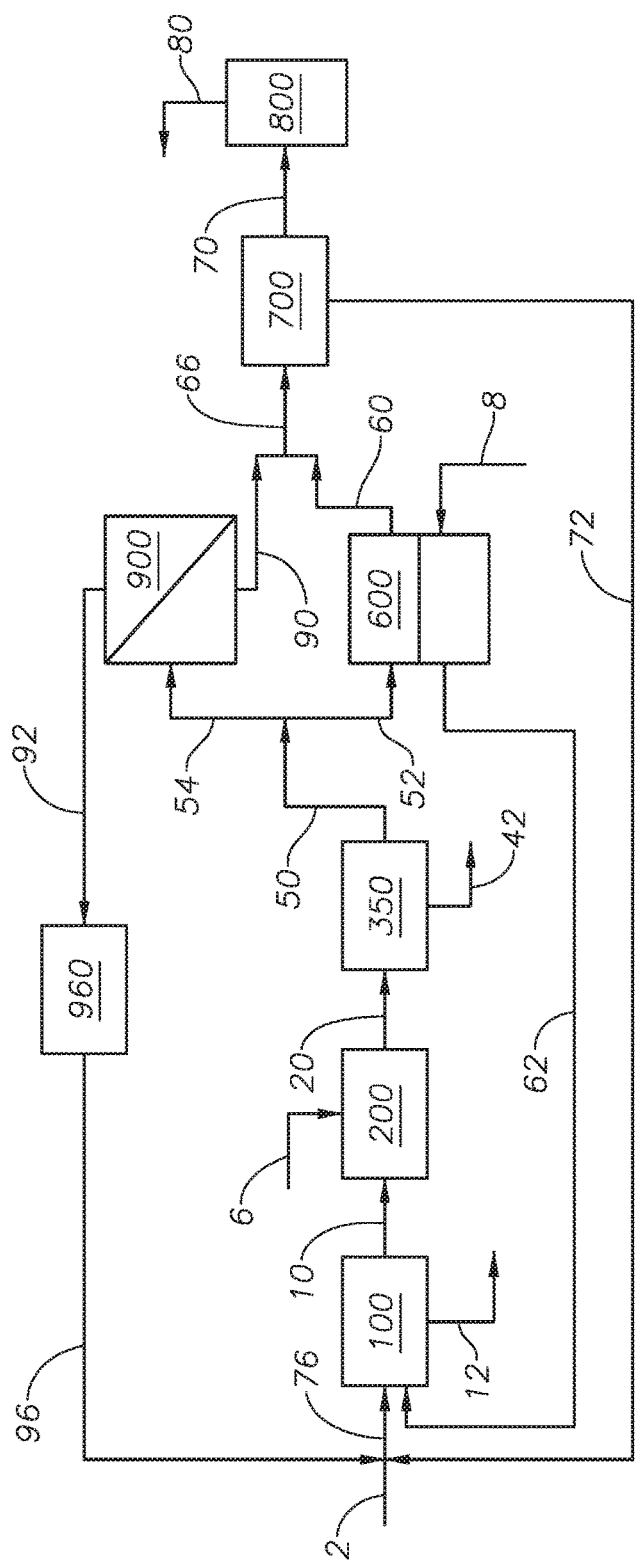
FIG. 3 is a process flow diagram of the method to recover sulfur.

Referring to FIG. 3, an embodiment of the invention is described with reference to FIG. 1. The embodiment as shown in FIG. 3 includes a pressure differential driven membrane unit in parallel with the membrane sweeping unit and a recycle pressure treatment unit. The use of the pressure differential driven membrane unit in parallel with the membrane sweeping unit can increase the recycle of $SO_2$ by at least 12%, alternately between 12% and 15%, and alternately by at least 15%. Advantageously, in embodiments of the present invention, with a pressure differential driven membrane unit in parallel with a membrane sweeping unit, the system for recovering sulfur includes at least one, but less than three Claus catalytic stages without a reduction in the overall sulfur recovery. Advantageously, the operation of a pressure differential driven membrane unit in parallel with a membrane sweeping unit reduces the size of sulfur dioxide absorption process 700.

Dehydrated stream 50 is divided into pressure differential driven membrane feed 54 and sweep membrane feed 52. The flow rate of each of pressure differential driven membrane feed 54 and sweep membrane feed 52 can be determined based on the composition of acid gas feed stream 2, the membrane characteristics of membrane sweeping unit 600, the characteristics of pressure differential driven membrane unit 900, the thermal oxidizer outlet composition, the target rate for $SO_2$ in stack outlet stream 80, the allowable sulfur dioxide emission limit, or combinations of the same. Pressure differential driven membrane feed 54 is introduced to pressure differential driven membrane unit 900 to produce pressure driven permeate recycle stream 92 and pressure driven residue stream 90.

Pressure differential driven membrane unit 900 can be any membrane unit where the driving force of separation is a pressure differential between the permeate side and the feed side of the pressure driven membrane, with the permeate side being at a lower pressure than the feed side. Pressure differential driven membrane unit 900 includes the pressure driven membrane. The pressure driven membrane can be the same membrane as in membrane sweeping unit 600. In at least one embodiment, pressure differential driven membrane unit 900 can increase efficiency of the sulfur recovery system. In at least one embodiment, the amount of $SO_2$ recovered in sweeping membrane unit 600 has an upper limit based on the saturation point with $SO_2$ of the amount of air needed in the reaction furnace of Claus process 100. When the upper limit of the amount of $SO_2$ that can be recovered in sweeping membrane unit 600 is reached, pressure differential driven membrane unit 900 can be used to recover additional $SO_2$ and feed the additional $SO_2$ to the reaction furnace of Claus process 100 given the saturation of the available air.

Pressure driven permeate recycle stream 92 is fed to recycle pressure treatment unit 960. Recycle pressure treatment unit 960 serves two functions. First, recycle pressure treatment unit 960 reduces the pressure on the permeate side of pressure differential driven membrane unit 900 to cause the pressure differential that drives separation in pressure differential driven membrane unit 900. Second, recycle pressure treatment unit 960 increases the pressure of the permeate stream so that the permeate stream can be fed to Claus process 100. One of skill in the art will appreciate that recycle pressure treatment unit 960 can include any process equipment capable of serving these functions and the specific configuration can be optimized to maximize $SO_2$ separation in the system.

Figure 3A:
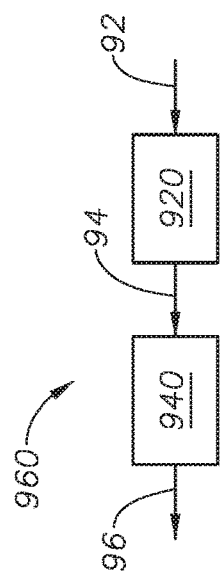
FIG. 3a is a detail process flow diagram of an embodiment of recycle pressure treatment unit 960.

As shown in FIG. 3a, in at least one embodiment, recycle pressure treatment unit 960 includes recycle vacuum pump 920 and recycle blower 940. Recycle vacuum pump 920 can reduce the pressure on the permeate side of pressure differential driven membrane unit 900, such that the pressure of pressure driven permeate recycle stream 92 is at a pressure below atmospheric pressure, alternately to a pressure less than about 10 psia, alternately less than about 5 psia, and alternately less than about 3 psia. The exhaust of recycle vacuum pump 920 exits as recycle vacuum pump outlet 94. Recycle vacuum pump outlet 94 is introduced to recycle blower 940. Recycle blower 940 can increase the pressure of recycle vacuum pump outlet 94 to produce membrane recycle stream 96. In at least one embodiment, the pressure of membrane recycle stream 96 is adjusted to meet the needs of the reaction furnace of Claus process 100. In at least one embodiment, the pressure of membrane recycle stream 96 is at least 2 atmosphere (atm).

Returning to FIG. 3, pressure driven residue stream 90 and sweep membrane residue stream 60 are combined to form residue stream 66. Any process unit that is capable of mixing or combining two gas streams can be used to combine pressure driven residue stream 90 and sweep membrane residue stream 60. Residue stream 66 is fed to sulfur dioxide absorption process 700.

Acid gas feed 2 is combined with absorption process outlet stream 72 and membrane recycle stream 96 to produce combined sulfur recovery feed 76. Combined sulfur recovery feed 76 is fed to Claus process 100 along with sulfur dioxide enriched air feed 62. In at least one embodiment according to FIG. 3, sulfur dioxide enriched air feed 62 can increase the flame temperature within the reaction furnace of the thermal stage of Claus process 100. In at least one embodiment according to FIG. 3, sulfur dioxide enriched air feed 62 can increase the flame temperature within the reaction furnace of the thermal stage of Claus process 100 by between about 2 K and about 4 K.

Referring to FIG. 4, with reference to FIGS. 1-3, an embodiment of the sulfur recovery system of the present invention is disclosed. Acid gas feed 2 is fed to feed treatment unit 130.

In certain embodiments, acid gas feed 2 includes a ratio of $H_2S$ to $CO_2$ of at least 1:3 and alternately a ratio of $H_2S$ to $CO_2$ of less than 1:3. In at least one embodiment of the present invention, the addition of carbon dioxide membrane unit 150 increases the ratio of $H_2S$ to $CO_2$ to 1:1. In at least one embodiment, carbon dioxide membrane unit 150 can be added to the sulfur recovery system when the concentration of $H_2S$ in acid gas feed 2 is less than 55% by weight.

Feed treatment unit 130 can include any process units capable of removing a portion of the $H_2O$ present in acid gas feed 2 to produce feed recovered water stream 11 and carbon dioxide membrane feed 14.

In at least one embodiment, as shown in FIG. 4a, feed treatment unit 130 includes feed flash unit 120 and feed heater 140. Acid gas feed 2 is fed to feed flash unit 120. Feed flash unit 120 is any type of separation unit capable of allowing water vapor present in acid gas feed 2 to condense as liquid water and separate, such that the gas in acid gas feed 2 is separated from the liquid water to produce feed recovered water stream 11. Feed recovered water stream 11 contains the liquid water condensed from acid gas feed 2. Removing water upstream of carbon dioxide membrane unit 150 avoids the condensation of water in the carbon dioxide-selective membrane Feed recovered water stream 11 can be sent to be further processed or collected for storage. Feed saturated stream 13 exits from feed flash unit 120. Feed saturated stream 13 contains those gases from acid gas feed 2 that were not condensed in feed flash unit 120. Feed saturated stream 13 can include $H_2S$, $CO_2$, and hydrocarbons. In at least one embodiment, any hydrocarbon present in feed saturated stream 13 is present in low quantities, such as less than 10% by weight, and can be combusted in the reaction furnace, Claus catalytic stage or both of Claus process 100. Feed saturated stream 13 is introduced to feed heater 140 to produce carbon dioxide membrane feed 14.

Feed heater 140 heats feed saturated stream 13 to a temperature above the dew point of the gases present in feed saturated stream 13 to ensure no liquids are present in carbon dioxide membrane feed 14, alternately to a temperature about 5 Kelvin (K) below the dew point. Feed heater 140 can be any type of heat exchanger capable of heating a gas stream. Carbon dioxide membrane feed 14 is fed to the feed side of carbon dioxide membrane unit 150.

Referring to FIG. 4, carbon dioxide membrane feed 14 is introduced to carbon dioxide membrane unit 150. Carbon dioxide membrane unit 150 can be any membrane unit where the driving force of separation is a pressure differential between the permeate side and the feed side of the membrane, with the permeate being at a lower pressure than the feed side. Carbon dioxide membrane unit 150 includes a carbon dioxide-selective membrane. The carbon dioxide-selective membrane is different from both the membrane in membrane sweeping unit 600 and the pressure driven membrane in pressure differential driven membrane unit 900. The carbon dioxide-selective membrane can be any type of separation membrane capable of separating carbon dioxide from carbon dioxide membrane feed 14. Examples of membranes for use as carbon dioxide-selective membrane in carbon dioxide membrane unit 150 include amorphous fluoroplastic membranes, amorphous perfluoropolymer membranes, and polymeric membranes including copolymers of tetrafluorethylene and perfluoromethyl vinyl ether. In at least one embodiment, the carbon dioxide-selective membrane has a $CO_2/H_2S$ selectivity from between about 3.0 to about 8.0.

Carbon dioxide permeates through the carbon dioxide-selective membrane of carbon dioxide membrane unit 150 from the feed side to the permeate side and exits as carbon dioxide permeate 15. Carbon dioxide permeate 15 can include $CO_2$ and $H_2S$. In at least one embodiment, there is less than 10% by weight $H_2S$ in carbon dioxide permeate 15. The remaining gases that do not permeate the carbon dioxide-selective membrane exit carbon dioxide membrane unit 150 as hydrogen sulfide retentate 17.

Hydrogen sulfide retentate 17 is rich in hydrogen sulfide. In at least one embodiment, hydrogen sulfide retentate contains greater than 90% by weight hydrogen sulfide, alternately greater than 80% by weight hydrogen sulfide, alternately greater than 70% by weight hydrogen sulfide, alternately greater than 60% by weight hydrogen sulfide, and alternately greater than 55% by weight hydrogen sulfide. Hydrogen sulfide retentate 17 is mixed with absorption process outlet stream 72 to form enriched acid gas feed 78. Enriched acid gas feed 78 is fed to Claus Process 100 along with sulfur dioxide enriched air feed 62. In at least one embodiment, according to the process as shown in FIG. 4, sulfur dioxide enriched air feed 62 has a minimal impact on the flame temperature within the reaction furnace of the thermal stage of Claus process 100.

Carbon dioxide permeate 15 exits carbon dioxide membrane unit 150 and is introduced to feed pressure treatment unit 170 to produce carbon dioxide enriched feed 18. Carbon dioxide enriched feed 18 is rich in carbon dioxide. Feed pressure treatment unit 170 serves two functions. First, feed pressure treatment unit 170 reduces the pressure on the permeate side of carbon dioxide membrane unit 150 to cause the pressure differential that drives separation in carbon dioxide membrane unit 150. Second, feed pressure treatment unit 170 increases the pressure of the permeate stream so that the permeate stream can be fed to Claus process 100. One of skill in the art will appreciate that feed pressure treatment unit 170 can include any process equipment capable of serving these functions and the specific configuration can be optimized to maximize $CO_2$ separation in the system.

As shown in FIG. 4b, in at least one embodiment, feed pressure treatment unit 170 includes feed vacuum pump 160 and feed blower 180. Feed vacuum pump 160 can reduce the pressure on the permeate side of carbon dioxide membrane unit 150, such that the pressure of carbon dioxide permeate 15 is at a pressure below atmospheric pressure, alternately at a pressure less than about 10 psia, alternately at a pressure less than about 5 psia, and alternately at a pressure less than about 3 psia. The exhaust of feed vacuum pump 160 exits as feed vacuum pump outlet 16. Feed vacuum pump outlet 16 is introduced to feed blower 180. Feed blower 180 can increase the pressure of feed vacuum pump outlet 16 to produce carbon dioxide enriched feed 18.

Carbon dioxide enriched feed 18 is introduced to thermal oxidizer 200 along with Claus outlet gas stream 10 and thermal oxidizer air feed 6. Advantageously, the separation of $CO_2$ from acid gas feed 2 and the introduction of the separated $CO_2$ to thermal oxidizer 200 thus bypassing Claus process 100 results in a reduced size or reduced number of the Claus catalytic stages. Advantageously, removing carbon dioxide with a membrane from the feed to Claus process 100 improves the performance of the reaction furnace because $CO_2$ reduces the flame temperature inside the reaction furnace and can require a pre-heating if the feed to the reaction furnace is too rich in $CO_2$. Advantageously, removing carbon dioxide with a membrane from the feed to Claus process 100 reduces the equipment size and energy consumption of each unit of Claus process 100 as the total volumetric flow that passes through Claus process 100 is reduced. Advantageously, removing carbon dioxide with a membrane from the feed to Claus process 100 reduces the formation of carbonyl compounds in the reaction furnace of Claus process 100. In at least one embodiment of the present invention, the system for recovering sulfur includes at least one, but less than three Claus catalytic stages without a reduction in the overall sulfur recovery.

With the use of instrumentation, the entire system can be monitored to minimize the $SO_2$ being discharged in stack outlet stream 80. Instrumentation can be used to measure the $SO_2$ in all of the feed and combined feed streams to Claus process 100, including acid gas feed 2, sulfur dioxide enriched air feed 62, absorption process outlet stream 72, combined Claus feed 74, combined sulfur recovery feed 76, membrane recycle stream 96, enriched acid gas feed 78, and hydrogen sulfide retentate 17, along with the air in each of those streams and the air demand in Claus process 100. The feedback can be used to adjust air flow rate. In one instance, a tail gas analyzer can be used to measure $SO_2$ in any of the process streams associated with FIGS. 1-4.

In at least one embodiment of the present invention, the feed to membrane sweeping unit 600 is in the absence of a compressor unit. Advantageously, the use of membranes in the process of the invention reduces or eliminates the need for rotating equipment, including for rotating equipment used in gas compression. The membranes do not require rotating equipment for their operation, beyond what is being used in other parts of the process, such as compression of the air used in the air sweep. In addition, as the driving force of the membrane is provided by the air sweep, the gas in the membrane gas feed does not need to be compressed. The use of membranes lowers waste gas content by increasing the overall sulfur recovery efficiency over systems that are in the absence of membranes. The permeate side of the membrane sweeping unit is in the absence of vacuum suction or low pressure conditions. In at least one embodiment, the membrane sweeping unit is in the absence of a recycle around the membrane sweeping unit, that is where a portion of the permeate is recycled to the feed side of the membrane.

EXAMPLES

The Examples illustrate the contribution of the membranes and the acid gas feed to the sulfur dioxide enriched air feed and to sulfur recovery. The variations between Examples were the membrane material, the membrane area and the composition of the acid gas feed. The membrane area was determined based on the membrane characteristics, the acid gas feed composition, and the temperature and the flow rate of the feed to the membrane. The operating conditions for acid gas feed 1 were the same for all examples.

Throughout the examples, references will be made to types of membranes for use in the various separation units. Table 1 includes a list of selected properties for exemplary membranes useful in the separation units of the present invention. The data in Table 1 was collected from independently developed data.

TABLE 1

Properties of exemplary membranes

| | Properties | | Membrane Properties | | | | | | | | |
|---|---|---|---|---|---|---|---|---|---|---|---|
| | | | Pebax ® 1657 | | PEI/ Pebax ® 1657 | | Polyvinylidene fluoride (w/18 wt. % sulfone) | | Cellulose Acetate impregnated with TEG-DME | | PEI/Pebax ® 3353 (HFM) | |
| Gas Components | NBP, °C. [1] | Kinetic Diameter, Å [1] | $\alpha_i/co_2$ | GPU | $\alpha_i/co_2$ | GPU | $\alpha_i/co_2$ | GPU | $\alpha_i/co_2$ | GPU | $\alpha_i/co_2$ | GPU |
| $H_2S$ | −60 | 3.6 | $1.42^b$ | 141.57 | $0.93^e$ | 93.5 | | | | | | |
| $CO_2$ | −78 | 3.3 | 1 | $100.00^a$ | 1 | $100.00^a$ | 1 | $100.00^a$ | 1 | $100.00^a$ | 1 | $100.00^a$ |
| $H_2O$ | 100 | 2.65 | | | | | $146.4^d$ | 14640 | | | | |
| $O_2$ | −183 | 3.46 | $0.03^c$ | 3.19 | | | | | | | | |
| $N_2$ | −196 | 3.64 | $0.01^b$ | | $0.02^b$ | 1.76 | $0.05^f$ | 4.65 | $0.03^g$ | 3.05 | $0.02^h$ | 1.64 |
| $SO_2$ | 157.65 | 3.60 | $336.81^b$ | 33680.9 | $264.23^e$ | 26422.76 | $215^f$ | 21500 | $95.24^g$ | 9523.81 | $66.3^h$ | 6630 |
| Ar | −186 | 3.40 | | | | | | | | | | |

| | Properties | | Membrane Properties | | | | | | | | |
|---|---|---|---|---|---|---|---|---|---|---|---|
| | | | Cellulose Triacetate | | Ionic Liquid [emim] [BF4] supported on polyethersulfone | | Ionic Liquid [$N_{222}$] [dimalonate] supported on polyethersulfone | | Polyacrylate-35 | | High Flux Polycarbonate | |
| Gas Components | NBP, °C. [1] | Kinetic Diameter, Å [1] | $\alpha_i/co_2$ | GPU | $\alpha_i/co_2$ | GPU | $\alpha_i/co_2$ | GPU | $\alpha_i/co_2$ | GPU | $\alpha_i/co_2$ | GPU |
| $H_2S$ | −60 | 3.6 | $0.86^d$ | 86.00 | | | | | | | | |
| $CO_2$ | −78 | 3.3 | 1 | $100.00^a$ | 1 | $100.00^a$ | 1 | $100.00^a$ | 1 | $100.00^a$ | 1 | $440^r$ |
| $H_2O$ | 100 | 2.65 | $238.7^d$ | 23870.00 | | | | | | | | |
| $O_2$ | −183 | 3.46 | $0.16^j$ | 16 | | | | | | | 0.19 | $82^r$ |
| $N_2$ | −196 | 3.64 | $0.04^f$ | 3.57 | $0.09^m$ | 8.74 | $0.03^m$ | 3.00 | $0.043^n$ | 4.3 | 0.03 | $12^r$ |
| $SO_2$ | 157.65 | 3.60 | $48.21^f$ | 4821.43 | $19.48^m$ | 1947.92 | $18.00^m$ | 1800.00 | $20.40^n$ | 2040.05 | 0.91 | $400^r$ |
| Ar | −186 | 3.40 | 0.25 | 250 | | | | | | | | |

1 GPU = $10^{-6}$ cm$^3$ (STP)/cm$^2$ · s· cmHg, or 3.35 × $10^{-10}$ mol/m$^2$.s.Pa in SI unit. Permanence (Pressure Normalized flux) Unit
$\alpha_i/co_2$: Selectivity of the i-component to $CO_2$.

Figure 5:
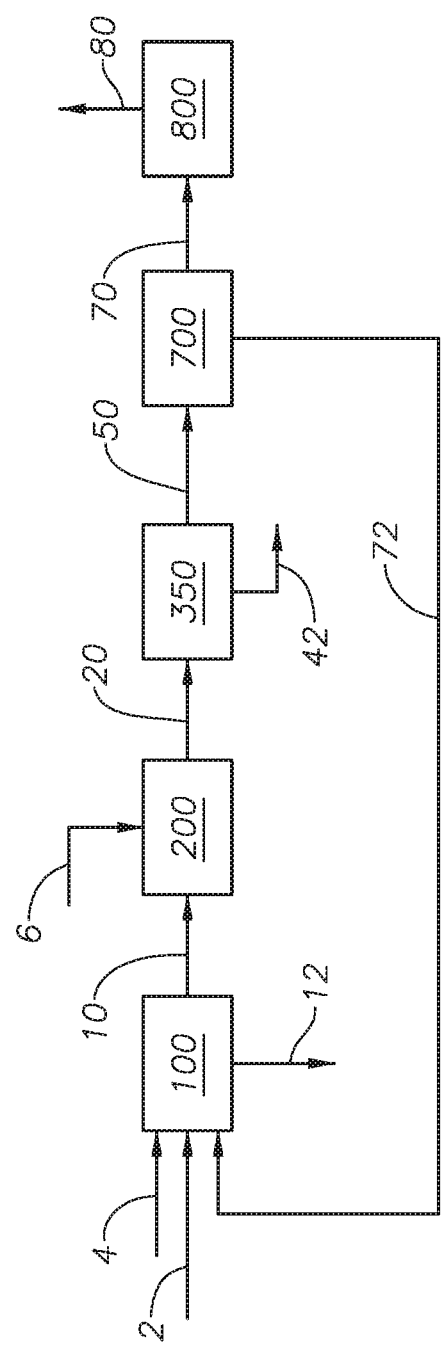
FIG. 5 is a process flow diagram of a process without membranes.

The Examples were based on the configuration embodied in the figures and described herein. Examples 1-6 are with reference to FIG. 5 representing a sulfur recovery system in the absence of membranes and provided for comparative purposes. As shown in FIG. 5, acid gas feed 2 and air feed 4 are fed to Claus process 100. Dehydrated stream 50 is fed to sulfur dioxide absorption process 700. FIG. 5 is in the absence of a membrane.

Example 1

Example 1 was simulated based on the configuration embodied in FIG. 5 and described above and is a comparative example. The simulation contained no membranes. The resulting concentrations of components % vol for selected streams are shown in Table 2.

TABLE 2

Stream Conditions and Flowrates for Example 1.

|  | Stream 2 | Stream 4 | Stream 6 | Stream 10 | Stream 12 | Stream 20 | Stream 50 | Stream 70 | Stream 72 |
|---|---|---|---|---|---|---|---|---|---|
| Phase | Vapor | Vapor | Vapor | Vapor | Liquid | Vapor | Vapor | Vapor | Vapor |
| Temp (° C.) | 41.9 | 20 | 20 | 212.4 | 281.5 | 482.2 | 25.0 | 25.0 | 27 |
| Pressure (psia) | 28.1 | 14.7 | 14.7 | 23.8 | 23.8 | 28.9 | 28.9 | 28.9 | 28.9 |
| Flow Rate (Kg-mol/hr) | 3581.7 | 5990.2 | 344.0 | 8353.4 | 2584.3 | 8677.9 | 5935.3 | 5879.6 | 54.1 |
| $H_2S$ | 0.722 | 0.000 | 0.000 | 0.004 | 0.000 | 0.000 | 0.000 | 0.000 | 0.000 |
| $CO_2$ | 0.241 | 0.000 | 0.000 | 0.103 | 0.000 | 0.099 | 0.145 | 0.147 | 0.000 |
| $H_2O$ | 0.038 | 0.013 | 0.013 | 0.331 | 0.000 | 0.323 | 0.010 | 0.010 | 0.000 |
| $O_2$ | 0.000 | 0.207 | 0.207 | 0.000 | 0.000 | 0.002 | 0.003 | 0.003 | 0.000 |
| $N_2$ | 0.000 | 0.771 | 0.771 | 0.553 | 0.000 | 0.562 | 0.823 | 0.830 | 0.000 |
| Sulfur | 0.000 | 0.000 | 0.000 | 0.000 | 1.000 | 0.000 | 0.000 | 0.000 | 0.000 |
| $SO_2$ | 0.000 | 0.000 | 0.000 | 0.002 | 0.000 | 0.006 | 0.009 | 0.000 | 1.000 |
| Ar | 0.000 | 0.009 | 0.009 | 0.007 | 0.000 | 0.007 | 0.010 | 0.010 | 0.000 |

The simulation was based on a Claus process with 3 Claus catalytic stages in series. The reaction furnace temperature outlet is 1050° C. The obtained conversion for the reaction furnace was 59.16%. The total sulfur recovered by the system is 99.99% or 1957.37 long-tons/day.

Example 2

Example 2 was simulated based on the configuration embodied in FIG. 5 and described above and is a comparative example. The simulation contained no membranes. The resulting concentrations of components % vol for selected streams are shown in Table 3.

TABLE 3

Stream Conditions and Flowrates for Example 2.

|  | Stream 2 | Stream 4 | Stream 6 | Stream 10 | Stream 12 | Stream 20 | Stream 50 | Stream 70 | Stream 72 |
|---|---|---|---|---|---|---|---|---|---|
| Phase | Vapor | Vapor | Vapor | Vapor | Liquid | Vapor | Vapor | Vapor | Vapor |
| Temp (° C.) | 41.9 | 20 | 20 | 212.4 | 286.6 | 482.2 | 25.0 | 25.0 | 27 |
| Pressure (psia) | 28.1 | 14.7 | 14.7 | 23.8 | 25.9 | 28.9 | 28.9 | 28.9 | 28.9 |
| Flow Rate (Kg-mol/hr) | 3581.7 | 4751.5 | 1587.1 | 8353.4 | 2584.5 | 8939.1 | 6197.5 | 5887.5 | 309.9 |
| $H_2S$ | 0.722 | 0.000 | 0.000 | 0.004 | 0.000 | 0.000 | 0.000 | 0.000 | 0.000 |
| $CO_2$ | 0.241 | 0.000 | 0.000 | 0.103 | 0.000 | 0.097 | 0.139 | 0.147 | 0.000 |
| $H_2O$ | 0.038 | 0.013 | 0.013 | 0.331 | 0.000 | 0.314 | 0.010 | 0.011 | 0.000 |
| $O_2$ | 0.000 | 0.207 | 0.207 | 0.000 | 0.000 | 0.002 | 0.003 | 0.003 | 0.000 |
| $N_2$ | 0.000 | 0.771 | 0.771 | 0.553 | 0.000 | 0.547 | 0.788 | 0.830 | 0.000 |
| Sulfur | 0.000 | 0.000 | 0.000 | 0.000 | 1.000 | 0.000 | 0.000 | 0.000 | 0.000 |
| $SO_2$ | 0.000 | 0.000 | 0.000 | 0.002 | 0.000 | 0.035 | 0.050 | 0.000 | 1.000 |
| Ar | 0.000 | 0.009 | 0.009 | 0.007 | 0.000 | 0.007 | 0.009 | 0.010 | 0.000 |

The simulation was based on a Claus process with 1 Claus catalytic stage. The reaction furnace temperature outlet is 1050° C. The conversion in Claus process 100 is 89%. As compared to Example 1, the amount of $SO_2$ to be recovered in sulfur dioxide absorption process 700 is 5.73 times greater. As a result, the cost of an sulfur dioxide absorption process 700 is expected to be between 4 and 6 times greater than if Claus process 100 employed three Claus catalytic stages. The total sulfur recovered by the system is 99.99% or 1957.37 long-tons/day.

Example 3

Example 3 was simulated based on the configuration embodied in FIG. 5 and is a comparative example. The simulation contained no membranes. The resulting concentrations of components % vol for selected streams are shown in Table 4.

TABLE 4

Stream Conditions and Flowrates for Example 3.

|  | Stream 2 | Stream 4 | Stream 6 | Stream 10 | Stream 12 | Stream 20 | Stream 50 | Stream 70 | Stream 72 |
|---|---|---|---|---|---|---|---|---|---|
| Phase | Vapor | Vapor | Vapor | Vapor | Liquid | Vapor | Vapor | Vapor | Vapor |
| Temp (° C.) | 41.9 | 20 | 20 | 206.1 | 281.7 | 482.2 | 25.0 | 25.0 | 27.0 |
| Pressure (psia) | 28.1 | 14.7 | 14.7 | 23.8 | 23.8 | 28.9 | 28.9 | 28.9 | 28.9 |
| Flow Rate (Kg-mol/hr) | 3581.7 | 4376.2 | 262.3 | 7067.5 | 1887.2 | 7312.8 | 5266.9 | 5227.8 | 39.2 |
| $H_2S$ | 0.527 | 0.000 | 0.000 | 0.004 | 0.000 | 0.000 | 0.000 | 0.000 | 0.000 |
| $CO_2$ | 0.431 | 0.000 | 0.000 | 0.219 | 0.000 | 0.211 | 0.293 | 0.296 | 0.000 |
| $H_2O$ | 0.042 | 0.013 | 0.013 | 0.293 | 0.000 | 0.287 | 0.010 | 0.010 | 0.000 |
| $O_2$ | 0.000 | 0.207 | 0.207 | 0.000 | 0.000 | 0.002 | 0.003 | 0.003 | 0.000 |
| $N_2$ | 0.000 | 0.771 | 0.771 | 0.477 | 0.000 | 0.488 | 0.678 | 0.683 | 0.000 |
| Sulfur | 0.000 | 0.000 | 0.000 | 0.000 | 1.000 | 0.000 | 0.000 | 0.000 | 0.000 |
| $SO_2$ | 0.000 | 0.000 | 0.000 | 0.002 | 0.000 | 0.005 | 0.007 | 0.000 | 1.000 |
| Ar | 0.000 | 0.009 | 0.009 | 0.006 | 0.000 | 0.006 | 0.008 | 0.008 | 0.000 |

The simulation was based on a Claus process with 3 Claus catalytic stages in series. The reaction furnace temperature outlet is 1050° C. The total sulfur recovered by the system is 99.99% or 1429.38 long-tons/day.

Example 4

Example 4 was simulated based on the configuration embodied in FIG. 5 and is a comparative example. The simulation contained no membranes. The resulting concentrations of components % vol for selected streams are shown in Table 5.

TABLE 5

Stream Conditions and Flowrates for Example 4.

|  | Stream 2 | Stream 4 | Stream 6 | Stream 10 | Stream 12 | Stream 20 | Stream 50 | Stream 70 | Stream 72 |
|---|---|---|---|---|---|---|---|---|---|
| Phase | Vapor | Vapor | Vapor | Vapor | Liquid | Vapor | Vapor | Vapor | Vapor |
| Temp (° C.) | 41.9 | 20 | 20 | 258.6 | 286.9 | 482.2 | 25.0 | 24.8 | 27.0 |
| Pressure (psia) | 28.1 | 14.7 | 14.7 | 25.9 | 25.9 | 28.9 | 28.9 | 28.9 | 28.9 |
| Flow Rate (Kg-mol/hr) | 3581.7 | 3485.1 | 1154.7 | 6431.6 | 1887.3 | 7500.7 | 5456.7 | 5233.3 | 223.4 |
| $H_2S$ | 0.527 | 0.000 | 0.000 | 0.021 | 0.000 | 0.000 | 0.000 | 0.000 | 0.000 |
| $CO_2$ | 0.431 | 0.000 | 0.000 | 0.240 | 0.000 | 0.206 | 0.283 | 0.295 | 0.000 |
| $H_2O$ | 0.042 | 0.013 | 0.013 | 0.302 | 0.000 | 0.280 | 0.010 | 0.010 | 0.000 |
| $O_2$ | 0.000 | 0.207 | 0.207 | 0.000 | 0.000 | 0.002 | 0.003 | 0.003 | 0.000 |
| $N_2$ | 0.000 | 0.771 | 0.771 | 0.418 | 0.000 | 0.477 | 0.655 | 0.683 | 0.000 |

TABLE 5-continued

Stream Conditions and Flowrates for Example 4.

|  | Stream 2 | Stream 4 | Stream 6 | Stream 10 | Stream 12 | Stream 20 | Stream 50 | Stream 70 | Stream 72 |
|---|---|---|---|---|---|---|---|---|---|
| Sulfur | 0.000 | 0.000 | 0.000 | 0.003 | 1.000 | 0.000 | 0.000 | 0.000 | 0.000 |
| $SO_2$ | 0.000 | 0.000 | 0.000 | 0.011 | 0.000 | 0.030 | 0.041 | 0.000 | 1.000 |
| Ar | 0.000 | 0.009 | 0.009 | 0.005 | 0.000 | 0.006 | 0.008 | 0.008 | 0.000 |

The simulation was based on a Claus process with 1 Claus catalytic stage. The reaction furnace temperature outlet is 1050° C. The conversion in Claus process 100 is 89%. As compared to Example 3, the amount of $SO_2$ to be recovered in sulfur dioxide absorption process 700 is 5.7 times greater. As a result, the cost of an sulfur dioxide absorption process 700 is expected to be almost 6 times greater than if Claus process 100 employed three Claus catalytic stages. The total sulfur recovered by the system is 99.99% or 1429.38 long-tons/day.

Example 5

Example 5 was simulated based on the configuration embodied in FIG. 5 and is a comparative example. The simulation contained no membranes. The resulting concentrations of components % vol for selected streams are shown in Table 6.

TABLE 6

Stream Conditions and Flowrates for Example 5.

|  | Stream 2 | Stream 4 | Stream 6 | Stream 10 | Stream 12 | Stream 20 | Stream 50 | Stream 70 | Stream 72 |
|---|---|---|---|---|---|---|---|---|---|
| Phase | Vapor | Vapor | Vapor | Vapor | Liquid | Vapor | Vapor | Vapor | Vapor |
| Temp (° C.) | 41.9 | 20 | 20 | 180.5 | 282.6 | 482.2 | 25.0 | 25.0 | 27.0 |
| Pressure (psia) | 28.1 | 14.7 | 14.7 | 23.8 | 23.8 | 28.9 | 28.9 | 28.9 | 28.9 |
| Flow Rate (Kg-mol/hr) | 3581.7 | 1992.1 | 135.9 | 5168.0 | 857.7 | 5296.9 | 4303.8 | 4286.6 | 17.2 |
| $H_2S$ | 0.240 | 0.000 | 0.000 | 0.002 | 0.000 | 0.000 | 0.000 | 0.000 | 0.000 |
| $CO_2$ | 0.719 | 0.000 | 0.000 | 0.498 | 0.000 | 0.486 | 0.598 | 0.600 | 0.000 |
| $H_2O$ | 0.042 | 0.013 | 0.013 | 0.198 | 0.000 | 0.196 | 0.010 | 0.010 | 0.000 |
| $O_2$ | 0.000 | 0.207 | 0.207 | 0.000 | 0.000 | 0.002 | 0.002 | 0.002 | 0.000 |
| $N_2$ | 0.000 | 0.771 | 0.771 | 0.297 | 0.000 | 0.309 | 0.381 | 0.382 | 0.000 |
| Sulfur | 0.000 | 0.000 | 0.000 | 0.000 | 1.000 | 0.000 | 0.000 | 0.000 | 0.000 |
| $SO_2$ | 0.000 | 0.000 | 0.000 | 0.001 | 0.000 | 0.003 | 0.004 | 0.000 | 1.000 |
| Ar | 0.000 | 0.009 | 0.009 | 0.004 | 0.000 | 0.004 | 0.005 | 0.005 | 0.000 |

The simulation was based on a Claus process with 3 Claus catalytic stages in series. The furnace temperature outlet is 1050° C. The total sulfur recovered by the system is 99.99% or 649.62 long-tons/day.

Example 6

Example 6 was simulated based on the configuration embodied in FIG. 5 and is a comparative example. The simulation contained no membranes. The resulting concentrations of components % vol for selected streams are shown in Table 7.

TABLE 7

Stream Conditions and Flowrates for Example 6.

| | Stream 2 | Stream 4 | Stream 6 | Stream 10 | Stream 12 | Stream 20 | Stream 50 | Stream 70 | Stream 72 |
|---|---|---|---|---|---|---|---|---|---|
| Phase | Vapor | Vapor | Vapor | Vapor | Liquid | Vapor | Vapor | Vapor | Vapor |
| Temp (° C.) | 41.9 | 20 | 20 | 225.6 | 287.7 | 482.2 | 25.0 | 24.9 | 27.0 |
| Pressure (psia) | 28.1 | 14.7 | 14.7 | 25.9 | 25.9 | 28.9 | 28.9 | 28.9 | 28.9 |
| Flow Rate (Kg-mol/hr) | 3581.7 | 1604.2 | 524.4 | 4889.0 | 857.7 | 5378.6 | 4386.3 | 4288.9 | 97.4 |
| $H_2S$ | 0.240 | 0.000 | 0.000 | 0.013 | 0.000 | 0.000 | 0.000 | 0.000 | 0.000 |
| $CO_2$ | 0.719 | 0.000 | 0.000 | 0.526 | 0.000 | 0.479 | 0.587 | 0.600 | 0.000 |
| $H_2O$ | 0.042 | 0.013 | 0.013 | 0.198 | 0.000 | 0.193 | 0.010 | 0.010 | 0.000 |
| $O_2$ | 0.000 | 0.207 | 0.207 | 0.000 | 0.000 | 0.002 | 0.002 | 0.003 | 0.000 |
| $N_2$ | 0.000 | 0.771 | 0.771 | 0.253 | 0.000 | 0.305 | 0.374 | 0.382 | 0.000 |
| Sulfur | 0.000 | 0.000 | 0.000 | 0.001 | 1.000 | 0.000 | 0.000 | 0.000 | 0.000 |
| $SO_2$ | 0.000 | 0.000 | 0.000 | 0.006 | 0.000 | 0.018 | 0.022 | 0.000 | 1.000 |
| Ar | 0.000 | 0.009 | 0.009 | 0.003 | 0.000 | 0.004 | 0.004 | 0.005 | 0.000 |

The simulation was based on a Claus process with 1 Claus catalytic stage. The furnace temperature outlet is 1050° C. The conversion in Claus process 100 is 89%. As compared to Example 5, the amount of $SO_2$ to be recovered in sulfur dioxide absorption process 700 is 5.67 times greater. As a result, the cost of an sulfur dioxide absorption process 700 is expected to be almost 6 times greater than if Claus process 100 employed three Claus catalytic stages. The total sulfur recovered by the system is 99.99% or 649.62 long-tons/day.

Example 7

Example 7 was simulated based on the configuration embodied in FIG. 1 and described above. Membrane sweeping unit 600 was modeled as a Pebax® 1657 type membrane with the properties as shown in Table 1 and a membrane area of 4000 m². The resulting concentrations of components % vol for selected streams are shown in Table 8.

TABLE 8

Stream Conditions and Flowrates for Example 7.

| | Stream 2 | Stream 8 | Stream 6 | Stream 10 | Stream 12 | Stream 20 | Stream 50 | Stream 60 | Stream 62 | Stream 70 | Stream 72 |
|---|---|---|---|---|---|---|---|---|---|---|---|
| Phase | Vapor | Vapor | Vapor | Vapor | Liquid | Vapor | Vapor | Vapor | Vapor | Vapor | Vapor |
| Temp (° C.) | 41.85 | 25 | 20 | 258.932 | 287.136 | 482.22 | 25 | 25 | 25.091 | 25 | 27 |
| Pressure (psia) | 28.117 | 29.40 | 14.696 | 25.941 | 25.941 | 28.9 | 28.9 | 28.9 | 29.4 | 28.900 | 28.9 |
| Flow Rate (Kg-mol/hr) | 3581.740 | 4785.57 | 1554.5 | 7504.09 | 2584.67 | 8944.51 | 6202.88 | 6046.61 | 4941.85 | 5887.11 | 159.49 |
| $H_2S$ | 0.722 | 0.000 | 0.000 | 0.025 | 0.000 | 0.000 | 0.000 | 0.000 | 0.000 | 0.000 | 0.000 |
| $CO_2$ | 0.241 | 0.000 | 0.000 | 0.117 | 0.000 | 0.098 | 0.141 | 0.143 | 0.003 | 0.147 | 0.000 |
| $H_2O$ | 0.038 | 0.013 | 0.013 | 0.346 | 0.000 | 0.313 | 0.010 | 0.010 | 0.013 | 0.011 | 0.000 |
| $O_2$ | 0.000 | 0.207 | 0.207 | 0.000 | 0.000 | 0.002 | 0.003 | 0.003 | 0.200 | 0.003 | 0.000 |
| $N_2$ | 0.000 | 0.771 | 0.771 | 0.491 | 0.000 | 0.546 | 0.788 | 0.808 | 0.746 | 0.830 | 0.000 |
| Sulfur | 0.000 | 0.000 | 0.000 | 0.003 | 1.000 | 0.000 | 0.000 | 0.000 | 0.000 | 0.000 | 0.000 |
| $SO_2$ | 0.000 | 0.000 | 0.000 | 0.013 | 0.000 | 0.034 | 0.049 | 0.026 | 0.029 | 0.000 | 1.000 |
| Ar | 0.000 | 0.009 | 0.009 | 0.006 | 0.000 | 0.007 | 0.009 | 0.010 | 0.009 | 0.010 | 0.000 |

According to the process as shown in Example 7, the total sulfur recovered by the system is 99.99% or 1957.64 long tons/day. The total sulfur recovered by the system (%) is the percent of sulfur recovered from the acid gas feed. The reaction furnace temperature is estimated to be about 976.52° C. a reduction as compared to the reaction furnace temperature of Example 1.

Example 8

Example 8 was simulated based on the configuration embodied in FIG. 3 and described above. Membrane sweeping unit 600 was modeled as a Pebax® 1657 type membrane with the properties as shown in Table 1 and a membrane area of 4000 m$^2$. Pressure differential driven membrane unit 900 was modeled as a Pebax® 1657 with a permeate side pressure of 1.5 psia. The resulting concentrations of components % vol for selected streams are shown in Table 9.

TABLE 9

Stream Conditions and Flowrates for Example 8.

|  | Stream 2 | Stream 8 | Stream 6 | Stream 10 | Stream 12 | Stream 20 | Stream 52 |
|---|---|---|---|---|---|---|---|
| Phase | Vapor | Vapor | Vapor | Vapor | Liquid | Vapor | Vapor |
| Temp (° C.) | 41.85 | 25 | 20 | 258.932 | 287.138 | 482.222 | 25 |
| Pressure (psia) | 28.117 | 29.40 | 14.696 | 25.941 | 25.941 | 28.9 | 28.9 |
| Flow Rate (Kg-mol/hr) | 3581.74 | 4785.735 | 1554.5 | 7542.448 | 2584.678 | 8982.972 | 3741.065 |
| $H_2S$ | 0.722 | 0.000 | 0.000 | 0.025 | 0.000 | 0.000 | 0.000 |
| $CO_2$ | 0.241 | 0.000 | 0.000 | 0.120 | 0.000 | 0.101 | 0.145 |
| $H_2O$ | 0.038 | 0.013 | 0.013 | 0.345 | 0.000 | 0.313 | 0.010 |
| $O_2$ | 0.000 | 0.207 | 0.207 | 0.000 | 0.000 | 0.002 | 0.003 |
| $N_2$ | 0.000 | 0.771 | 0.771 | 0.489 | 0.000 | 0.544 | 0.784 |
| Sulfur | 0.000 | 0.000 | 0.000 | 0.003 | 1.000 | 0.000 | 0.000 |
| $SO_2$ | 0.000 | 0.000 | 0.000 | 0.013 | 0.000 | 0.034 | 0.049 |
| Ar | 0.000 | 0.009 | 0.009 | 0.006 | 0.000 | 0.007 | 0.009 |

|  | Stream 60 | Stream 62 | Stream 70 | Stream 72 | Stream 90 | Stream 92 |
|---|---|---|---|---|---|---|
| Phase | Vapor | Vapor | Vapor | Vapor | Vapor | Vapor |
| Temp (° C.) | 25 | 25.091 | 25 | 27 | 25 | 25 |
| Pressure (psia) | 28.9 | 29.4 | 28.900 | 28.9 | 28.900 | 1.5 |
| Flow Rate (Kg-mol/hr) | 3612.292 | 4914.509 | 5881.095 | 120.333 | 2389.135 | 104.908 |
| $H_2S$ | 0.000 | 0.000 | 0.000 | 0.000 | 0.000 | 0.000 |
| $CO_2$ | 0.147 | 0.003 | 0.147 | 0.000 | 0.139 | 0.274 |
| $H_2O$ | 0.010 | 0.013 | 0.010 | 0.000 | 0.008 | 0.062 |
| $O_2$ | 0.003 | 0.201 | 0.003 | 0.000 | 0.003 | 0.000 |
| $N_2$ | 0.812 | 0.750 | 0.831 | 0.000 | 0.817 | 0.025 |
| Sulfur | 0.000 | 0.000 | 0.000 | 0.000 | 0.000 | 0.000 |
| $SO_2$ | 0.018 | 0.024 | 0.000 | 1.000 | 0.023 | 0.638 |
| Ar | 0.010 | 0.009 | 0.010 | 0.000 | 0.010 | 0.001 |

According to the process as simulated in Example 8, the total sulfur recovered by the system is 99.99% or 1957.64 long tons/day. The total sulfur recovered by the system (%) is the percent of sulfur recovered from the acid gas feed. Additionally, the system as disclosed in FIG. 3 used an additional 359.92 kW due to vacuum pump 1000 and blower 1100.

Example 9

Example 9 was simulated based on the configuration embodied in FIG. 1 and described above. Membrane sweeping unit 600 was modeled as a Pebax® 1657 type membrane with the properties as shown in Table 1 and a membrane area of 4300 m$^2$. The resulting concentrations of components % vol for selected streams are shown in Table 10.

TABLE 10

Stream Conditions and Flowrates for Example 9.

|  | Stream 2 | Stream 8 | Stream 6 | Stream 10 | Stream 12 | Stream 20 | Stream 50 | Stream 60 | Stream 62 | Stream 70 | Stream 72 |
|---|---|---|---|---|---|---|---|---|---|---|---|
| Phase | Vapor | Vapor | Vapor | Vapor | Liquid | Vapor | Vapor | Vapor | Vapor | Vapor | Vapor |
| Temp (° C.) | 41.85 | 25 | 25 | 267.559 | 286.644 | 482.222 | 25 | 25 | 25.109 | 25 | 27 |
| Pressure (psia) | 28.117 | 29.400 | 29.400 | 25.941 | 25.941 | 28.900 | 28.900 | 28.900 | 29.400 | 28.900 | 28.900 |
| Flow Rate (Kg-mol/hr) | 3581.74 | 4751.914 | 1588.305 | 7485.233 | 2584.610 | 8951.625 | 6210.087 | 6025.788 | 4936.213 | 5886.463 | 139.325 |
| $H_2S$ | 0.722 | 0.000 | 0.000 | 0.025 | 0.000 | 0.000 | 0.000 | 0.000 | 0.000 | 0.000 | 0.000 |
| $CO_2$ | 0.241 | 0.000 | 0.000 | 0.117 | 0.000 | 0.098 | 0.141 | 0.143 | 0.003 | 0.147 | 0.000 |
| $H_2O$ | 0.038 | 0.013 | 0.013 | 0.346 | 0.000 | 0.313 | 0.010 | 0.010 | 0.013 | 0.011 | 0.000 |
| $O_2$ | 0.000 | 0.207 | 0.207 | 0.000 | 0.000 | 0.002 | 0.003 | 0.003 | 0.199 | 0.003 | 0.000 |
| $N_2$ | 0.000 | 0.771 | 0.771 | 0.489 | 0.000 | 0.546 | 0.787 | 0.811 | 0.742 | 0.830 | 0.000 |
| Sulfur | 0.000 | 0.000 | 0.000 | 0.003 | 1.000 | 0.000 | 0.000 | 0.000 | 0.000 | 0.000 | 0.000 |
| $SO_2$ | 0.000 | 0.000 | 0.000 | 0.013 | 0.000 | 0.035 | 0.050 | 0.023 | 0.035 | 0.000 | 1.000 |
| Ar | 0.000 | 0.009 | 0.009 | 0.006 | 0.000 | 0.007 | 0.009 | 0.010 | 0.009 | 0.010 | 0.000 |

According to the process as simulated in Example 9, the total sulfur recovered by the system is 99.99% or 1957.59 long tons/day. The total sulfur recovered by the system (%) is the percent of sulfur recovered from the acid gas feed.

Example 10

Example 10 was simulated based on the configuration embodied in FIG. 1 and described above. Membrane sweeping unit 600 was modeled as a liquid membrane TEG-DME supported in cellulose acetate type membrane with the properties as shown in Table 1 and a membrane area of 11680 m². The resulting concentrations of components % vol for selected streams are shown in Table 11.

TABLE 11

Stream Conditions and Flowrates for Example 10.

|  | Stream 2 | Stream 8 | Stream 6 | Stream 10 | Stream 12 | Stream 20 | Stream 50 | Stream 60 | Stream 62 | Stream 70 | Stream 72 |
|---|---|---|---|---|---|---|---|---|---|---|---|
| Phase | Vapor | Vapor | Vapor | Vapor | Liquid | Vapor | Vapor | Vapor | Vapor | Vapor | Vapor |
| Temp (° C.) | 41.85 | 25 | 25 | 267.361 | 268.65 | 482.222 | 25 | 25 | 25.117 | 25 | 27 |
| Pressure (psia) | 28.117 | 29.400 | 29.400 | 25.941 | 25.941 | 28.900 | 28.900 | 28.900 | 29.400 | 28.900 | 28.900 |
| Flow Rate (Kg-mol/hr) | 3581.74 | 4753.687 | 1586.462 | 7509.289 | 2584.424 | 8974.409 | 6233.095 | 6026.239 | 4960.544 | 5887.064 | 139.175 |
| $H_2S$ | 0.722 | 0.000 | 0.000 | 0.025 | 0.000 | 0.000 | 0.000 | 0.000 | 0.000 | 0.000 | 0.000 |
| $CO_2$ | 0.241 | 0.000 | 0.000 | 0.120 | 0.000 | 0.100 | 0.144 | 0.143 | 0.008 | 0.147 | 0.000 |
| $H_2O$ | 0.038 | 0.013 | 0.013 | 0.345 | 0.000 | 0.312 | 0.010 | 0.010 | 0.013 | 0.011 | 0.000 |
| $O_2$ | 0.000 | 0.207 | 0.207 | 0.000 | 0.000 | 0.002 | 0.003 | 0.003 | 0.198 | 0.003 | 0.000 |
| $N_2$ | 0.000 | 0.771 | 0.771 | 0.488 | 0.000 | 0.544 | 0.784 | 0.811 | 0.738 | 0.830 | 0.000 |
| Sulfur | 0.000 | 0.000 | 0.000 | 0.003 | 1.000 | 0.000 | 0.000 | 0.000 | 0.000 | 0.000 | 0.000 |
| $SO_2$ | 0.000 | 0.000 | 0.000 | 0.013 | 0.000 | 0.035 | 0.050 | 0.023 | 0.034 | 0.000 | 1.000 |
| Ar | 0.000 | 0.009 | 0.009 | 0.006 | 0.000 | 0.006 | 0.009 | 0.010 | 0.009 | 0.010 | 0.000 |

According to the process as simulated in Example 10, the total sulfur recovered by the system is 99.99% or 1957.45 long tons/day. The total sulfur recovered by the system (%) is the percent of sulfur recovered from the acid gas feed.

Example 11

Example 11 was simulated based on the configuration embodied in FIG. 1 and described above. Membrane sweeping unit 600 was modeled as a cellulose triacetate type membrane with the properties as shown in Table 1 and a membrane area of 21200 m$^2$. The resulting concentrations of components % vol for selected streams are shown in Table 12.

TABLE 12

Stream Conditions and Flowrates for Example 11.

| | Stream 2 | Stream 8 | Stream 6 | Stream 10 | Stream 12 | Stream 20 | Stream 50 | Stream 60 | Stream 62 | Stream 70 | Stream 72 |
|---|---|---|---|---|---|---|---|---|---|---|---|
| Phase | Vapor | Vapor | Vapor | Vapor | Liquid | Vapor | Vapor | Vapor | Vapor | Vapor | Vapor |
| Temp (° C.) | 41.85 | 25 | 25 | 267.135 | 286.658 | 482.222 | 25 | 25 | 25.127 | 25 | 27 |
| Pressure (psia) | 28.117 | 29.400 | 29.400 | 25.941 | 25.941 | 28.900 | 28.900 | 28.900 | 29.400 | 28.900 | 28.900 |
| Flow Rate (Kg-mol/hr) | 3581.74 | 4752.751 | 1587.919 | 7536.968 | 2584.642 | 9003.140 | 6262.117 | 6026.584 | 4988.285 | 5887.389 | 139.195 |
| H$_2$S | 0.722 | 0.000 | 0.000 | 0.025 | 0.000 | 0.000 | 0.000 | 0.000 | 0.000 | 0.000 | 0.000 |
| CO$_2$ | 0.241 | 0.000 | 0.000 | 0.123 | 0.000 | 0.103 | 0.148 | 0.143 | 0.013 | 0.147 | 0.000 |
| H$_2$O | 0.038 | 0.013 | 0.013 | 0.344 | 0.000 | 0.311 | 0.010 | 0.010 | 0.013 | 0.011 | 0.000 |
| O$_2$ | 0.000 | 0.207 | 0.207 | 0.000 | 0.000 | 0.002 | 0.003 | 0.003 | 0.197 | 0.003 | 0.000 |
| N$_2$ | 0.000 | 0.771 | 0.771 | 0.486 | 0.000 | 0.543 | 0.780 | 0.811 | 0.734 | 0.830 | 0.000 |
| Sulfur | 0.000 | 0.000 | 0.000 | 0.003 | 1.000 | 0.000 | 0.000 | 0.000 | 0.000 | 0.000 | 0.000 |
| SO$_2$ | 0.000 | 0.000 | 0.000 | 0.013 | 0.000 | 0.034 | 0.050 | 0.023 | 0.034 | 0.000 | 1.000 |
| Ar | 0.000 | 0.009 | 0.009 | 0.006 | 0.000 | 0.006 | 0.009 | 0.010 | 0.009 | 0.010 | 0.000 |

According to the process as simulated in Example 11, the total sulfur recovered by the system is 99.99% or 1957.62 long tons/day. The total sulfur recovered by the system (%) is the percent of sulfur recovered from the acid gas feed.

Example 12

Example 12 was simulated based on the configuration embodied in FIG. 4 and described above. Membrane sweeping unit 600 was modeled as a Pebax® 1657 type membrane with the properties as shown in Table 1 and a membrane area of 6000 m$^2$. Carbon dioxide-selective membrane 150 was modeled as an AF1600 type membrane with a membrane area of 20982 m$^2$ and a permeate side pressure of 2.5 psia. The resulting concentrations of components % vol for selected streams are shown in Table 13.

TABLE 13

Stream Conditions and Flowrates for Example 12.

| | Stream 2 | Stream 8 | Stream 6 | Stream 10 | Stream 12 | Stream 20 | Stream 50 | Stream 60 | Stream 62 | Stream 70 | Stream 72 |
|---|---|---|---|---|---|---|---|---|---|---|---|
| Phase | Vapor | Vapor | Vapor | Vapor | Liquid | Vapor | Vapor | Vapor | Vapor | Vapor | Vapor |
| Temp (° C.) | 41.85 | 25 | 25 | 290.884 | 286.683 | 482.222 | 25 | 25 | 26.772 | 25 | 27 |
| Pressure (psia) | 28.117 | 29.400 | 24.9 | 25.941 | 25.941 | 28.9 | 28.9 | 28.9 | 29.4 | 28.900 | 28.9 |
| Flow Rate (Kg-mol/hr) | 3581.74 | 124.121 | 2006.402 | 1411.921 | 857.966 | 5658.86 | 4670.44 | 4487.323 | 307.240 | 4293.47 | 193.850 |

TABLE 13-continued

Stream Conditions and Flowrates for Example 12.

| | | | | | | | | | | |
|---|---|---|---|---|---|---|---|---|---|---|
| $H_2S$ | 0.240 | 0.000 | 0.000 | 0.045 | 0.000 | 0.000 | 0.000 | 0.000 | 0.000 | 0.000 | 0.000 |
| $CO_2$ | 0.719 | 0.000 | 0.000 | 0.434 | 0.000 | 0.468 | 0.567 | 0.574 | 0.238 | 0.600 | 0.000 |
| $H_2O$ | 0.042 | 0.013 | 0.013 | 0.423 | 0.000 | 0.183 | 0.010 | 0.010 | 0.005 | 0.011 | 0.000 |
| $O_2$ | 0.000 | 0.207 | 0.207 | 0.000 | 0.000 | 0.002 | 0.002 | 0.003 | 0.084 | 0.003 | 0.000 |
| $N_2$ | 0.000 | 0.771 | 0.771 | 0.068 | 0.000 | 0.290 | 0.351 | 0.366 | 0.311 | 0.382 | 0.000 |
| Sulfur | 0.000 | 0.000 | 0.000 | 0.008 | 1.000 | 0.000 | 0.000 | 0.000 | 0.000 | 0.000 | 0.000 |
| $SO_2$ | 0.000 | 0.000 | 0.000 | 0.022 | 0.000 | 0.054 | 0.065 | 0.043 | 0.358 | 0.000 | 1.000 |
| Ar | 0.000 | 0.009 | 0.009 | 0.001 | 0.000 | 0.003 | 0.004 | 0.004 | 0.004 | 0.005 | 0.000 |

| | Stream 15 | Stream 17 | Stream 18 |
|---|---|---|---|
| Phase | Vapor | Vapor | Vapor |
| Temp (° C.) | 41.85 | 41.85 | 226.85 |
| Pressure (psia) | 2.5 | 28.117 | 28.900 |
| Flow Rate (Kg-mol/hr) | 2382.417 | 1198.305 | 2382.41 |
| $H_2S$ | 0.083 | 0.550 | 0.083 |
| $CO_2$ | 0.854 | 0.450 | 0.854 |
| $H_2O$ | 0.063 | 0.000 | 0.063 |
| $O_2$ | 0.000 | 0.000 | 0.000 |
| $N_2$ | 0.000 | 0.000 | 0.000 |
| Sulfur | 0.000 | 0.000 | 0.000 |
| $SO_2$ | 0.000 | 0.000 | 0.000 |
| Ar | 0.000 | 0.000 | 0.000 |

According to the process as simulated in Example 12, the total sulfur recovered by the system is 99.99% or 649.82 long tons/day. The total sulfur recovered by the system (%) is the percent of sulfur recovered from the acid gas feed. Additionally, the system as disclosed in FIG. 4 and FIG. 4b used an additional 8034.16 kW due to feed vacuum pump 160 and feed blower 180.

Example 13

Example 13 was simulated based on the configuration embodied in FIG. 1 and described above. Membrane sweeping unit 600 was modeled as a Pebax® 1657 type membrane with the properties as shown in Table 1 and a membrane area of 4800 m². The resulting concentrations of components % vol for selected streams are shown in Table 14.

TABLE 14

Stream Conditions and Flowrates for Example 13.

| | Stream 2 | Stream 8 | Stream 6 | Stream 10 | Stream 12 | Stream 20 | Stream 50 | Stream 60 | Stream 62 | Stream 70 | Stream 72 |
|---|---|---|---|---|---|---|---|---|---|---|---|
| Phase | Vapor | Vapor | Vapor | Vapor | Liquid | Vapor | Vapor | Vapor | Vapor | Vapor | Vapor |
| Temp (° C.) | 41.85 | 25 | 25 | 258.374 | 286.658 | 482.222 | 25 | 25 | 25.114 | 25 | 27 |
| Pressure (psia) | 28.117 | 29.400 | 29.400 | 25.941 | 25.941 | 28.900 | 28.900 | 28.900 | 29.400 | 28.900 | 28.900 |
| Flow Rate (Kg-mol/hr) | 3581.74 | 3484.248 | 1155.745 | 6461.344 | 1887.453 | 7531.036 | 5487.328 | 5339.179 | 3632.397 | 5233.193 | 105.986 |
| $H_2S$ | 0.527 | 0.000 | 0.000 | 0.021 | 0.000 | 0.000 | 0.000 | 0.000 | 0.000 | 0.000 | 0.000 |
| $CO_2$ | 0.431 | 0.000 | 0.000 | 0.244 | 0.000 | 0.209 | 0.287 | 0.289 | 0.009 | 0.295 | 0.000 |
| $H_2O$ | 0.042 | 0.013 | 0.013 | 0.301 | 0.000 | 0.279 | 0.010 | 0.010 | 0.013 | 0.011 | 0.000 |
| $O_2$ | 0.000 | 0.207 | 0.207 | 0.000 | 0.000 | 0.002 | 0.003 | 0.003 | 0.198 | 0.003 | 0.000 |
| $N_2$ | 0.000 | 0.771 | 0.771 | 0.415 | 0.000 | 0.475 | 0.651 | 0.670 | 0.739 | 0.683 | 0.000 |
| Sulfur | 0.000 | 0.000 | 0.000 | 0.003 | 1.000 | 0.000 | 0.000 | 0.000 | 0.000 | 0.000 | 0.000 |
| $SO_2$ | 0.000 | 0.000 | 0.000 | 0.011 | 0.000 | 0.030 | 0.041 | 0.020 | 0.032 | 0.000 | 1.000 |
| Ar | 0.000 | 0.009 | 0.009 | 0.005 | 0.000 | 0.006 | 0.008 | 0.008 | 0.009 | 0.008 | 0.000 |

According to the process as simulated in Example 13, the total sulfur recovered by the system is 99.99% or 1429.56 long tons/day. The total sulfur recovered by the system (%) is the percent of sulfur recovered from the acid gas feed.

Example 14

Example 14 was simulated based on the configuration embodied in FIG. 1 and described above. Membrane sweeping unit 600 was modeled as a liquid membrane TEG-DME supported in cellulose acetate type membrane with the properties as shown in Table 1 and a membrane area of 14500 m². The resulting concentrations of components % vol for selected streams are shown in Table 15.

TABLE 15

Stream Conditions and Flowrates for Example 14.

| | Stream 2 | Stream 8 | Stream 6 | Stream 10 | Stream 12 | Stream 20 | Stream 50 | Stream 60 | Stream 62 | Stream 70 | Stream 72 |
|---|---|---|---|---|---|---|---|---|---|---|---|
| Phase | Vapor | Vapor | Vapor | Vapor | Liquid | Vapor | Vapor | Vapor | Vapor | Vapor | Vapor |
| Temp (° C.) | 41.85 | 25 | 25 | 257.833 | 286.905 | 482.222 | 25 | 25 | 25.141 | 25 | 27 |
| Pressure (psia) | 28.117 | 29.400 | 29.400 | 25.941 | 25.941 | 28.900 | 28.900 | 28.900 | 29.400 | 28.900 | 28.900 |
| Flow Rate (Kg-mol/hr) | 3581.74 | 3484.208 | 1155.388 | 6520.087 | 1887.409 | 7590.646 | 5547.529 | 5340.395 | 3691.343 | 5234.513 | 105.882 |
| $H_2S$ | 0.527 | 0.000 | 0.000 | 0.021 | 0.000 | 0.000 | 0.000 | 0.000 | 0.000 | 0.000 | 0.000 |
| $CO_2$ | 0.431 | 0.000 | 0.000 | 0.251 | 0.000 | 0.215 | 0.295 | 0.289 | 0.025 | 0.295 | 0.000 |
| $H_2O$ | 0.042 | 0.013 | 0.013 | 0.298 | 0.000 | 0.277 | 0.010 | 0.010 | 0.013 | 0.011 | 0.000 |
| $O_2$ | 0.000 | 0.207 | 0.207 | 0.000 | 0.000 | 0.002 | 0.003 | 0.003 | 0.195 | 0.003 | 0.000 |
| $N_2$ | 0.000 | 0.771 | 0.771 | 0.412 | 0.000 | 0.471 | 0.644 | 0.669 | 0.727 | 0.683 | 0.000 |
| Sulfur | 0.000 | 0.000 | 0.000 | 0.002 | 1.000 | 0.000 | 0.000 | 0.000 | 0.000 | 0.000 | 0.000 |
| $SO_2$ | 0.000 | 0.000 | 0.000 | 0.011 | 0.000 | 0.029 | 0.040 | 0.020 | 0.032 | 0.000 | 1.000 |
| Ar | 0.000 | 0.009 | 0.009 | 0.005 | 0.000 | 0.006 | 0.008 | 0.008 | 0.009 | 0.008 | 0.000 |

According to the process as simulated in Example 14, the total sulfur recovered by the system is 99.99% or 1429.53 long tons/day. The total sulfur recovered by the system (%) is the percent of sulfur recovered from the acid gas feed.

Example 15

Example 15 was simulated based on the configuration embodied in FIG. 1 and described above. Membrane sweeping unit 600 was modeled as a cellulose triacetate type membrane with the properties as shown in Table 1 and a membrane area of 29800 m². The resulting concentrations of components % vol for selected streams are shown in Table 16.

TABLE 16

Stream Conditions and Flowrates for Example 15.

| | Stream 2 | Stream 8 | Stream 6 | Stream 10 | Stream 12 | Stream 20 | Stream 50 | Stream 60 | Stream 62 | Stream 70 | Stream 72 |
|---|---|---|---|---|---|---|---|---|---|---|---|
| Phase | Vapor | Vapor | Vapor | Vapor | Liquid | Vapor | Vapor | Vapor | Vapor | Vapor | Vapor |
| Temp (° C.) | 41.85 | 25 | 25 | 257.833 | 286.923 | 482.222 | 25 | 25 | 25.178 | 25 | 27 |
| Pressure (psia) | 28.117 | 29.400 | 29.400 | 25.941 | 25.941 | 28.900 | 28.900 | 28.900 | 29.400 | 28.900 | 28.900 |
| Flow Rate (Kg-mol/hr) | 3581.74 | 3486.392 | 1155.112 | 6607.715 | 1887.443 | 7676.515 | 5634.269 | 5341.216 | 3779.445 | 5235.485 | 105.731 |
| $H_2S$ | 0.527 | 0.000 | 0.000 | 0.021 | 0.000 | 0.000 | 0.000 | 0.000 | 0.000 | 0.000 | 0.000 |
| $CO_2$ | 0.431 | 0.000 | 0.000 | 0.260 | 0.000 | 0.224 | 0.305 | 0.289 | 0.047 | 0.295 | 0.000 |
| $H_2O$ | 0.042 | 0.013 | 0.013 | 0.294 | 0.000 | 0.273 | 0.010 | 0.011 | 0.012 | 0.011 | 0.000 |
| $O_2$ | 0.000 | 0.207 | 0.207 | 0.000 | 0.000 | 0.002 | 0.003 | 0.003 | 0.191 | 0.003 | 0.000 |
| $N_2$ | 0.000 | 0.771 | 0.771 | 0.407 | 0.000 | 0.466 | 0.635 | 0.669 | 0.711 | 0.683 | 0.000 |

TABLE 16-continued

Stream Conditions and Flowrates for Example 15.

|  | Stream 2 | Stream 8 | Stream 6 | Stream 10 | Stream 12 | Stream 20 | Stream 50 | Stream 60 | Stream 62 | Stream 70 | Stream 72 |
|---|---|---|---|---|---|---|---|---|---|---|---|
| Sulfur | 0.000 | 0.000 | 0.000 | 0.002 | 1.000 | 0.000 | 0.000 | 0.000 | 0.000 | 0.000 | 0.000 |
| $SO_2$ | 0.000 | 0.000 | 0.000 | 0.010 | 0.000 | 0.029 | 0.040 | 0.020 | 0.031 | 0.000 | 1.000 |
| Ar | 0.000 | 0.009 | 0.009 | 0.005 | 0.000 | 0.006 | 0.008 | 0.008 | 0.008 | 0.008 | 0.000 |

According to the process as simulated in Example 15, the total sulfur recovered by the system is 99.99% or 1429.56 long tons/day. The total sulfur recovered by the system (%) is the percent of sulfur recovered from the acid gas feed.

Example 16

Example 16 was simulated based on the configuration embodied in FIG. 2 and described above. Membrane sweeping unit 600 was modeled as a Pebax® 1657 type membrane with the properties as shown in Table 1 and a membrane area of 4800 $m^2$. The resulting concentrations of components % vol for selected streams are shown in Table 17.

TABLE 17

Stream Conditions and Flowrates for Example 16.

|  | Stream 2 | Stream 8 | Stream 10 | Stream 12 | Stream 20 | Stream 50 | Stream 60 | Stream 62 | Stream 64 | Stream 68 | Stream 70 | Stream 72 |
|---|---|---|---|---|---|---|---|---|---|---|---|---|
| Phase | Vapor | Vapor | Vapor | Liquid | Vapor | Vapor | Vapor | Vapor | Vapor | Vapor | Vapor | Vapor |
| Temp (° C.) | 41.9 | 25.0 | 267.6 | 286.6 | 482.2 | 25.0 | 24.9 | 25.1 | 25.1 | 25.1 | 24.8 | 27.0 |
| Pressure (psia) | 28.1 | 29.4 | 25.9 | 25.9 | 28.9 | 28.9 | 28.9 | 29.4 | 29.4 | 29.4 | 28.9 | 28.9 |
| Flow Rate (Kg-mol/hr) | 3581.7 | 6288.1 | 7482.9 | 2584.3 | 8950.3 | 6212.7 | 5999.3 | 6501.5 | 1588.3 | 4913.2 | 5839.4 | 159.9 |
| $H_2S$ | 0.722 | 0.000 | 0.025 | 0.000 | 0.000 | 0.000 | 0.000 | 0.000 | 0.000 | 0.000 | 0.000 | 0.000 |
| $CO_2$ | 0.241 | 0.000 | 0.117 | 0.000 | 0.098 | 0.141 | 0.144 | 0.003 | 0.003 | 0.003 | 0.148 | 0.000 |
| $H_2O$ | 0.038 | 0.013 | 0.347 | 0.000 | 0.313 | 0.010 | 0.010 | 0.013 | 0.013 | 0.013 | 0.011 | 0.000 |
| $O_2$ | 0.000 | 0.207 | 0.000 | 0.000 | 0.001 | 0.001 | 0.001 | 0.200 | 0.200 | 0.200 | 0.001 | 0.000 |
| $N_2$ | 0.000 | 0.771 | 0.489 | 0.000 | 0.541 | 0.780 | 0.808 | 0.745 | 0.745 | 0.745 | 0.830 | 0.000 |
| Sulfur | 0.000 | 0.000 | 0.003 | 1.000 | 0.000 | 0.000 | 0.000 | 0.000 | 0.000 | 0.000 | 0.000 | 0.000 |
| $SO_2$ | 0.000 | 0.000 | 0.013 | 0.000 | 0.040 | 0.058 | 0.027 | 0.030 | 0.030 | 0.030 | 0.000 | 1.000 |
| Ar | 0.000 | 0.009 | 0.006 | 0.000 | 0.006 | 0.009 | 0.010 | 0.009 | 0.009 | 0.009 | 0.010 | 0.000 |

According to the process as simulated in Example 16, the total sulfur recovered by the system is 99.99% or 1957.37 long tons/day. The total sulfur recovered by the system (%) is the percent of sulfur recovered from the acid gas feed. Example 16 simulates an approach where all of the air for the system is used as sweep air in membrane sweeping unit 600 (as compared to the process shown in FIG. 1, where only the air for Claus process 100 is used as sweep air). The increased flow rate of air through membrane sweeping unit 600 means there is a greater capacity for sweeping of $SO_2$. However, because thermal oxidizer air 64 injects $SO_2$ to thermal oxidizer 200 and sulfur is only precipitated and condensed in Claus process 100, there is an increase of the sulfur content in absorption process outlet stream 72. Example 4 illustrates that even though there is more $SO_2$ separated in membrane sweeping unit 600 on a mass basis (as compared to the process shown in FIG. 1), there is a lower percentage of $SO_2$ recycled to the reaction furnace of Claus process 100, for a fixed membrane area. To compensate for this, the area of the membrane has to be increased. Compare the membrane area of Example 9 with the membrane area for this Example 16.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a," "an," and "the" include plural referents, unless the context clearly dictates otherwise.

Optional or optionally means that the subsequently described event or circumstances can or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

As used herein and in the appended claims, the words "comprise," "has," and "include" and all grammatical variations thereof are each intended to have an open, non-limiting meaning that does not exclude additional elements or steps.

As used herein, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present invention.

What is claimed:

1. A system for recovering sulfur from an acid gas feed, the system comprising:
  a Claus process, the Claus process configured to convert a combined Claus feed to produce a Claus outlet gas stream and a recovered sulfur stream, wherein the combined Claus feed comprises the acid gas feed and an absorption process outlet stream, wherein the acid gas feed comprises hydrogen sulfide such that the acid gas feed has a hydrogen sulfide concentration, wherein the absorption process outlet stream comprises sulfur dioxide, wherein the Claus outlet gas stream comprises sulfur-containing compounds, hydrogen sulfide, and sulfur dioxide; wherein the recovered sulfur stream comprises elemental sulfur,
  a thermal oxidizer fluidly connected to the Claus process, the thermal oxidizer configured to convert sulfur-containing compounds and hydrogen sulfide in the Claus outlet gas stream to sulfur dioxide to produce a thermal oxidizer outlet stream, wherein the thermal oxidizer outlet stream comprises the sulfur dioxide and water vapor;
  a gas treatment unit fluidly connected to the thermal oxidizer, the thermal oxidizer configured to cool the thermal oxidizer outlet stream to produce a process condensed water stream and a dehydrated stream, wherein the dehydrated stream comprises sulfur dioxide;
  a membrane sweeping unit fluidly connected to the gas treatment unit, the membrane sweeping unit configured to separate sulfur dioxide in the dehydrated stream to produce a sweep membrane residue stream and a sulfur dioxide enriched air feed, wherein the membrane sweeping unit comprises a membrane, wherein the sulfur dioxide permeates through the membrane of the membrane sweeping unit to a permeate side of the membrane, wherein the sweep membrane residue stream comprises sulfur dioxide; and
  a sulfur dioxide absorption process fluidly connected to the membrane sweeping unit, the sulfur dioxide absorption process is configured to produce the absorption process outlet stream and a stack feed, the sulfur dioxide absorption process configured to separate sulfur dioxide from the sweep membrane residue stream, wherein the stack feed is below an allowable sulfur dioxide emission limit.

2. The system of claim 1, further comprising an incinerator stack fluidly connected to the sulfur dioxide absorption process.

3. The system of claim 1, wherein the membrane is an [emim][BF4] ionic liquid supported on a polyethersulfone.

4. The system of claim 1, wherein the membrane is selected from the group consisting of polydimethylsiloxane (PDMS), polyphosphazenes, PEBAX® (polyether block amide), polyamide-polyether block copolymers, cellulose acetate, cellulose acetate impregnated with TEG-DME, cellulose diacetate, cellulose triacetate, Nafion® 117 (perfluorosulfonic acid), rubbery Nafion®, sulfonated polyimides, sulfonated polymers, supported ionic liquid membranes (SILMs), polycarbonate, membrane contactors, polyethylene glycol (PEG), polyacrylate, sulfolane, polytrimethylsilyl methyl methacrylate (PTMSMMA), and 3-methylsulfolane blend membranes.

5. The system of claim 1, wherein the hydrogen sulfide concentration is greater than 25%.

6. The system of claim 1, wherein a sulfur recovery is greater than 99.2 wt %.

7. The system of claim 1, wherein the Claus process comprises a reaction furnace, a condenser, and one Claus catalytic stage.

8. A system for recovering sulfur from an acid gas feed, the system comprising:
  a Claus process, the Claus process configured to convert a combined Claus feed to produce a Claus outlet gas stream and a recovered sulfur stream, wherein the combined Claus feed comprises the acid gas feed and an absorption process outlet stream, wherein the acid gas feed comprises hydrogen sulfide such that the acid gas feed has a hydrogen sulfide concentration, wherein the absorption process outlet stream comprises sulfur dioxide, wherein the Claus outlet gas stream comprises sulfur-containing compounds, hydrogen sulfide, and sulfur dioxide; wherein the recovered sulfur stream comprises elemental sulfur,
  a thermal oxidizer fluidly connected to the Claus process, the thermal oxidizer configured to convert sulfur-containing compounds and hydrogen sulfide in the Claus outlet gas stream to sulfur dioxide to produce a thermal oxidizer outlet stream, wherein the thermal oxidizer outlet stream comprises the sulfur dioxide and water vapor;
  a gas treatment unit fluidly connected to the thermal oxidizer, the thermal oxidizer configured to cool the thermal oxidizer outlet stream to produce a process condensed water stream and a dehydrated stream, wherein the dehydrated stream comprises sulfur dioxide;
  a membrane sweeping unit fluidly connected to the gas treatment unit, the membrane sweeping unit configured to separate sulfur dioxide from a sweep membrane feed to produce a sweep membrane residue stream and a sulfur dioxide enriched air feed, wherein the sweep membrane feed is separated from the dehydrated stream, wherein the membrane sweeping unit comprises a membrane, wherein the sulfur dioxide permeates through the membrane of the membrane sweeping unit to a permeate side of the membrane, wherein the sweep membrane residue stream comprises sulfur dioxide;
  a pressure differential driven membrane unit fluidly connected to the gas treatment unit, the pressure differential driven membrane configured to separate sulfur dioxide from a pressure differential driven membrane feed to produce a pressure driven residue stream and a pressure driven permeate recycle stream, wherein the pressure differential driven membrane feed is separated from the dehydrated stream, wherein the pressure differential driven membrane unit comprises a pressure driven membrane, wherein the pressure driven membrane has a permeate side and a feed side, wherein the sulfur dioxide permeates from the feed side of the pressure driven membrane to the permeate side of the pressure driven membrane, wherein the pressure driven permeate recycle stream has a permeate pressure, wherein the permeate pressure is below atmospheric pressure;

a recycle pressure treatment unit fluidly connected to the pressure differential driven membrane unit, the recycle pressure treatment unit configured to increase the permeate pressure of the pressure driven permeate recycle stream to above atmospheric pressure; and a sulfur dioxide absorption process fluidly connected to the membrane sweeping unit and the pressure differential driven membrane feed, the sulfur dioxide absorption process configured to produce the absorption process outlet stream and a stack feed, the sulfur dioxide absorption process configured to separate sulfur dioxide from a residue stream, wherein the residue stream comprises the sweep membrane residue stream and the pressure driven residue stream, wherein the stack feed is below an allowable sulfur dioxide emission limit.

9. The system of claim 8, wherein the membrane is an [emim][BF4] ionic liquid supported on a polyethersulfone.

10. The system of claim 8, wherein the membrane is selected from the group consisting of polydimethylsiloxane (PDMS), polyphosphazenes, PEBAX® (polyether block amide), polyamide-polyether block copolymers, cellulose acetate, cellulose acetate impregnated with TEG-DME, cellulose diacetate, cellulose triacetate, Nafion® 117 (perfluorosulfonic acid), rubbery Nafion®, sulfonated polyimides, sulfonated polymers, supported ionic liquid membranes (SILMs), polycarbonate, membrane contactors, polyethylene glycol (PEG), polyacrylate, sulfolane, polytrimethylsilyl methyl methacrylate (PTMSMMA), and 3-methylsulfolane blend membranes.

11. The system of claim 8, wherein the pressure driven membrane is an [emim][BF4] ionic liquid supported on a polyethersulfone.

12. The system of claim 8, wherein the pressure driven membrane is selected from the group consisting of polydimethylsiloxane (PDMS), polyphosphazenes, PEBAX® (polyether block amide), polyamide-polyether block copolymers, cellulose acetate, cellulose acetate impregnated with TEG-DME, cellulose diacetate, cellulose triacetate, Nafion® 117 (perfluorosulfonic acid), rubbery Nafion®, sulfonated polyimides, sulfonated polymers, supported ionic liquid membranes (SILMs), polycarbonate, membrane contactors, polyethylene glycol (PEG), polyacrylate, sulfolane, polytrimethylsilyl methyl methacrylate (PTMSMMA), and 3-methylsulfolane blend membranes.

13. The system of claim 8, wherein a sulfur recovery is greater than 99.2 wt %.

14. The system of claim 8, wherein the Claus process comprises a reaction furnace, a condenser, and one Claus catalytic stage.

15. A system for recovering sulfur from an acid gas feed, the system comprising the steps of:

a feed treatment unit, the feed treatment unit configured to condense water vapor in the acid gas feed to produce a feed recovered water stream and a carbon dioxide membrane feed, wherein the carbon dioxide membrane feed comprises carbon dioxide and hydrogen sulfide, wherein the acid gas feed has a hydrogen sulfide concentration;

a carbon dioxide membrane unit fluidly connected to the feed treatment unit, the carbon dioxide membrane unit configured to separate carbon dioxide from the carbon dioxide membrane feed to produce a carbon dioxide permeate and a hydrogen sulfide retentate, wherein the carbon dioxide membrane unit comprises a carbon dioxide-selective membrane, wherein the carbon dioxide permeate has a carbon dioxide permeate pressure, wherein the carbon dioxide permeate pressure is below atmospheric pressure;

a feed pressure treatment unit fluidly connected to the carbon dioxide membrane unit, the feed pressure treatment unit configured to increase the carbon dioxide permeate pressure of the carbon dioxide permeate to produce a carbon dioxide enriched feed, wherein the carbon dioxide permeate pressure of the carbon dioxide enriched feed is above atmospheric pressure;

a Claus process fluidly connected to the feed pressure treatment unit, the Claus process configured to convert an enriched acid gas stream to produce a Claus outlet gas stream and a recovered sulfur stream, wherein the enriched acid gas stream comprises the hydrogen sulfide retentate and an absorption process outlet stream, wherein the absorption process outlet stream comprises sulfur dioxide, wherein the Claus outlet gas stream comprises sulfur-containing compounds, hydrogen sulfide, and sulfur dioxide; wherein the recovered sulfur stream comprises elemental sulfur, a thermal oxidizer fluidly connected to the Claus process, the thermal oxidizer configured to convert sulfur-containing compounds and hydrogen sulfide in the Claus outlet gas stream to sulfur dioxide to produce a thermal oxidizer outlet stream, wherein the thermal oxidizer outlet stream comprises the sulfur dioxide and water vapor;

a gas treatment unit fluidly connected to the thermal oxidizer, the thermal oxidizer configured to cool the thermal oxidizer outlet stream to produce a process condensed water stream and a dehydrated stream, wherein the dehydrated stream comprises sulfur dioxide;

a membrane sweeping unit fluidly connected to the gas treatment unit, the membrane sweeping unit configured to separate sulfur dioxide in the dehydrated stream to produce a sweep membrane residue stream and a sulfur dioxide enriched air feed, wherein the membrane sweeping unit comprises a membrane, wherein the sulfur dioxide permeates through the membrane of the membrane sweeping unit to a permeate side of the membrane, wherein the sweep membrane residue stream comprises sulfur dioxide; and a sulfur dioxide absorption process fluidly connected to the membrane sweeping unit, the sulfur dioxide absorption process is configured to produce the absorption process outlet stream and a stack feed, the sulfur dioxide absorption process configured to separate sulfur dioxide from the sweep membrane residue stream, wherein the stack feed is below an allowable sulfur dioxide emission limit.

16. The system of claim 15, wherein the membrane is an [emim][BF4] ionic liquid supported on a polyethersulfone.

17. The system of claim 15, wherein the membrane is selected from the group consisting of polydimethylsiloxane (PDMS), polyphosphazenes, PEBAX® (polyether block amide), polyamide-polyether block copolymers, cellulose acetate, cellulose acetate impregnated with TEG-DME, cellulose diacetate, cellulose triacetate, Nafion® 117 (perfluorosulfonic acid), rubbery Nafion® (perfluorosulfonic acid), sulfonated polyimides, sulfonated polymers, supported ionic liquid membranes (SILMs), polycarbonate, membrane contactors, polyethylene glycol (PEG), polyacrylate, sulfolane, polytrimethylsilyl methyl methacrylate (PTMSMMA), and 3-methylsulfolane blend membranes.

18. The system of claim 15, wherein the carbon dioxide-selective membrane is selected from the group consisting of amorphous fluoroplastic membranes, amorphous perfluoropolymer membranes, and polymeric membranes comprising copolymers of tetrafluoroethylene and perfluoromethyl vinyl ether.

19. The system of claim 15, wherein a sulfur recovery is greater than 99.2 wt %.

20. The system of claim 15, wherein a concentration of $H_2S$ in the acid gas feed is less than 55% by weight.

* * * * *

UNITED STATES PATENT AND TRADEMARK OFFICE
CERTIFICATE OF CORRECTION

PATENT NO. : 10,479,684 B2
APPLICATION NO. : 16/127971
DATED : November 19, 2019
INVENTOR(S) : Jean-Pierre R. Ballaguet et al.

Page 1 of 1

It is certified that error appears in the above-identified patent and that said Letters Patent is hereby corrected as shown below:

On the Title Page

(73) The Assignee should read "Saudi Arabian Oil Company"

Signed and Sealed this
Fourth Day of February, 2020

Andrei Iancu
*Director of the United States Patent and Trademark Office*